United States Patent
Mather et al.

(10) Patent No.: US 10,471,648 B2
(45) Date of Patent: Nov. 12, 2019

(54) FUNCTIONALLY GRADED SHAPE MEMORY POLYMER

(71) Applicants: Patrick Mather, Oxford, PA (US); Xiaofan Luo, Cleveland, OH (US); Andrew M. DiOrio, Windham, NH (US); Kyung-Min Lee, Wright-Patterson AFB, OH (US)

(72) Inventors: Patrick Mather, Oxford, PA (US); Xiaofan Luo, Cleveland, OH (US); Andrew M. DiOrio, Windham, NH (US); Kyung-Min Lee, Wright-Patterson AFB, OH (US)

(73) Assignee: Syracuse University, Syracuse, NY (US)

(*) Notice: Subject to any disclaimer, the term of this patent is extended or adjusted under 35 U.S.C. 154(b) by 96 days.

(21) Appl. No.: 15/446,487

(22) Filed: Mar. 1, 2017

(65) Prior Publication Data
US 2017/0297258 A1 Oct. 19, 2017

Related U.S. Application Data

(62) Division of application No. 13/401,606, filed on Feb. 21, 2012, now abandoned.
(Continued)

(51) Int. Cl.
*B29C 61/06* (2006.01)
*C08F 220/12* (2006.01)
(Continued)

(52) U.S. Cl.
CPC ............ *B29C 61/06* (2013.01); *C08F 220/12* (2013.01); *C08F 220/14* (2013.01); *C08L 63/00* (2013.01);
(Continued)

(58) Field of Classification Search
CPC ..... Y10T 428/24479; Y10T 428/24983; Y10T 428/24628; C08F 220/12; C08F 220/14;
(Continued)

(56) References Cited

U.S. PATENT DOCUMENTS

2008/0085946 A1* 4/2008 Mather ............... B29C 35/0266
522/4

OTHER PUBLICATIONS

DiOrio et al. A functionally graded shape memory polymer. Soft Matters, 2011,7,68, pp. 68-74. Online. Retrieved [Jun. 19, 2018]. Retrieved from <URL://http://pubs.rsc.org/en/results?artrefjournalname=soft%20matter&artrefstartpage=68&artrefvolumeyear=2011&fcategory=journal> (Year: 2010).*

* cited by examiner

*Primary Examiner* — Sanza L. McClendon
(74) *Attorney, Agent, or Firm* — Bond, Schoeneck & King, PLLC; Frederick Price; David Nocilly

(57) ABSTRACT

A functionally graded shape memory polymer (SMP) that has a range of transition temperatures that are spatially distributed in a gradient fashion within one single article. The SMP is formed by post-curing a pre-cured glassy SMP in a linear temperature gradient that imposes different vitrification temperature limits at different positions along the gradient. Utilizing indentation-based surface shape memory coupled with optical measurements of photoelastic response, the capability of this material to respond over a wide range of thermal triggers is correlated with the graded glass transition behavior. This new class of SMP offers great potential for such applications as passive temperature sensing and precise control of shape evolution during a thermally triggered shape recovery.

7 Claims, 27 Drawing Sheets

Related U.S. Application Data

(60) Provisional application No. 61/444,298, filed on Feb. 18, 2011.

(51) Int. Cl.
*C08F 220/14* (2006.01)
*C08L 63/00* (2006.01)
*C08L 71/02* (2006.01)
*C08L 75/04* (2006.01)

(52) U.S. Cl.
CPC .......... *C08L 71/02* (2013.01); *C08G 2280/00* (2013.01); *C08L 75/04* (2013.01); *C08L 2205/05* (2013.01); *Y10T 428/24479* (2015.01); *Y10T 428/24628* (2015.01); *Y10T 428/24983* (2015.01)

(58) Field of Classification Search
CPC ...... C08L 63/00; C08L 71/02; C08L 2205/05; C08G 2280/00; B29C 61/06
See application file for complete search history.

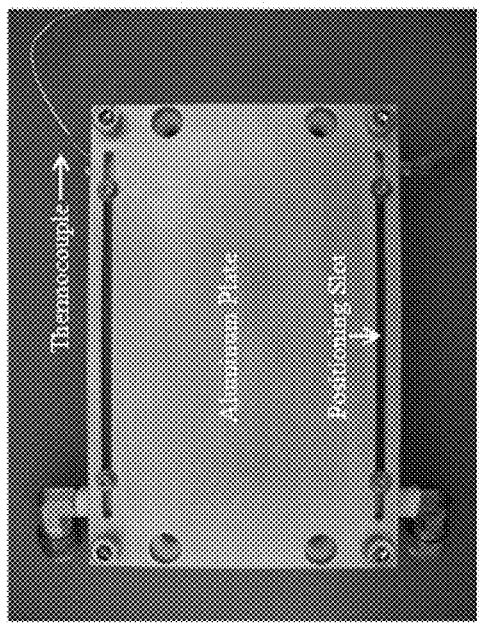
FIG. 1C
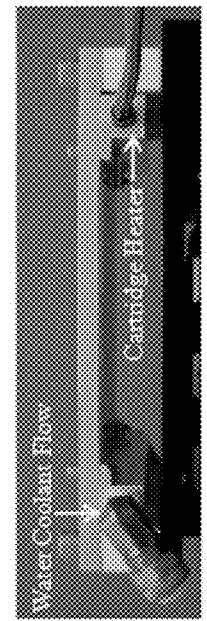
FIG. 1D
FIG. 1A
FIG. 1B

FUNCTIONALLY GRADED SHAPE MEMORY POLYMER

CROSS-REFERENCE TO RELATED APPLICATIONS

The present application claims the benefit of and priority to U.S. Non-Provisional patent application Ser. No. 13/401,606, filed on Feb. 21, 2012, which claims the benefit of and priority to U.S. Provisional Patent Application No. 61/444,298, filed on Feb. 18, 2011, each of which are hereby incorporated by reference herein in their respective entireties.

STATEMENT OF FEDERALLY SPONSORED RESEARCH

This invention was made with government support under Grant No. DMR-0907578 awarded by the National Science Foundation (NSF) and Grant No. FA9550-09-1-0195 awarded by the Air Force Office of Scientific Research (AFOSR). The government has certain rights in the invention.

BACKGROUND OF THE INVENTION

1. Field of the Invention

The present invention relates to shape memory polymers and, more specifically, to a shape memory polymer having a range of transition temperatures that are spatially distributed in a gradient fashion within one single article.

2. Description of the Related Art

Shape memory polymers (SMPs) are a class of "smart" materials that can switch between two shapes on command, from a fixed (temporary) shape to a pre-determined permanent shape upon the application of an external stimulus such as heat. This shape memory behavior is generally characterized using programmed, cyclic thermomechanical tests referred to as the shape memory cycle (SMC). In a typical SMC, the SMP is first deformed at an elevated temperature that is higher than its transition temperature, $T_{trans}$ (either $T_m$ or $T_g$). The deformation is elastic in nature and mainly leads to a reduction in conformational entropy of the constituent network chains, following the rubber elasticity theory. Commonly applied deformation modes include tension, compression, and bending. The deformed SMP is then cooled to a temperature below its $T_{trans}$ while maintaining constant the external strain or stress. During cooling, the material transitions to a more rigid state (semi-crystalline or glassy), which kinetically traps or "freezes" the constituent network chains in this low-entropy state. Macroscopically the material retains, or "fixes," the temporary strain/shape even when external stress is released. Shape recovery is finally triggered by heating the material through $T_{trans}$ under a stress-free (unconstrained)—or even loaded (constrained)—condition. By allowing the network chains (with regained mobility) to relax to their thermodynamically favored, maximal-entropy state, the material changes from the temporary to its permanent shape. Two characteristic ratios, fixing ratio ($R_f$) and recovery ratio ($R_r$) characterize the shape memory performance (shape fixing and shape recovery) for comparison among different material systems.

SMPs have several intrinsic advantages over the traditionally used shape memory alloys (SMAs) including larger deformation strains, tunable transition temperatures, low density and low manufacturing cost. As a result they have attracted a significant amount of research interest during the past decade. Novel SMPs have been developed with responsiveness to non-heat stimuli such as light, electricity, and magnetic field, and with new recovery behavior including two-way shape memory and triple-shape memory.

The stimuli-responsiveness gives SMPs an ability to sense environmental changes such as an increase of temperature, and respond in a prescribed manner. However, the application of conventional SMPs as temperature sensors is still limited, mainly due to the fact that there is usually only one $T_{trans}$ associated with a given material, as determined by its constituent molecular composition and architecture. In other words, conventional SMPs only respond to a threshold temperature trigger and are unable to respond to temperatures over a broad range.

Following are a number of references that provide background information to the present invention, each of which is hereby incorporated by reference: C. Liu, H. Qin and P. T. Mather, J. Mater. Chem., 2007, 17, 1543-1558; P. T. Mather, X. F. Luo and I. A. Rousseau, Annu. Rev. Mater. Res., 2009, 39, 445-471; A. Lendlein and S. Kelch, Angew. Chem. Int. Edit., 2002, 41, 2034-2057; D. Ratna and J. Karger-Kocsis, J. Mater. Sci., 2008, 43, 254-269; I. A. Rousseau, Polym. Eng. Sci., 2008, 48, 2075-2089; L. R. G. Treloar, The Physics of Rubber Elasticity, 3rd Ed., Clarendon Press, Oxford, 1975; A. Lendlein, H. Y. Jiang, O. Junger and R. Langer, Nature, 2005, 434, 879-882; Y. J. Liu, H. B. Lv, X. Lan, J. S. Leng and S. Y. Du, Compos. Sci. Technol., 2009, 69, 2064; X. F. Luo and P. T. Mather, Soft Matter, 2010, 6, 2146-2149; R. Mohr, K. Kratz, T. Weigel, M. Lucka-Gabor, M. Moneke and A. Lendlein, Proceedings of the National Academy of Sciences of the United States of America, 2006, 103, 3540-3545; H. H. Qin and P. T. Mather, Macromolecules, 2009, 42, 273-280; T. Chung, A. Romo-Uribe and P. T. Mather, Macromolecules, 2008, 41, 184-192; I. Bellin, S. Kelch, R. Langer and A. Lendlein, Proceedings of the National Academy of Sciences of the United States of America, 2006, 103, 18043-18047; M. Bell and A. Lendlein, J. Mater. Chem., 2010, 20, 3335-3345; T. Xie, X. C. Xiao and Y. T. Cheng, Macromol. Rapid Commun., 2009, 30, 1823-1827; T. Pretsch, Smart Mater. Struct., 2010, 19, 015006; X. F. Luo and P. T. Mather, Adv. Funct. Mater., early view online, DOI: 10.1002/adfm.201000052; J. Kunzelman, T. Chung, P. T. Mather and C. Weder, J. Mater. Chem., 2008, 18, 1082-1086; J. Y. Wong, A. Velasco, P. Rajagopalan and Q. Pham, Langmuir, 2003, 19, 1908-1913; X. F. Yao, D. L. Liu and H. Y. Yeh, J. Appl. Polym. Sci., 2007, 106, 3253-3258; P. Z. Zhao, X. Y. Hua, Y. S. Wang, J. H. Zhu and Q. Z. Wen, Mater. Sci. Eng., A, 2007, 457, 231-235; B. Hexig, H. Alata, N. Asakawa and Y. Inoue, J. Polym. Sci., Part B: Polym. Phys., 2005, 43, 368-377; Y. B. Zhu, N. Y. Ning, Y. Sun, Q. Zhang and Q. Fu, Macromol. Mater. Eng., 2006, 291, 1388-1396; B. Y. Wen, G. Wu and J. Yu, Polymer, 2004, 45, 3359-3365; F. M. Gallant, H. A. Bruck and A. K. Kota, J. Compos. Mater., 2004, 38, 1873-1893; K. K. U. Stellbrink, G. Hausser and R. Steegmuller, J. Thermoplast. Compos. Mater., 1999, 12, 188-200; B. Kieback, A. Neubrand and H. Riedel, Mater. Sci. Eng., A, 2003, 362, 81-105; W. C. Oliver and G. M. Pharr, J. Mater. Res., 1992, 7, 1564-1583; K. Gall, P. Kreiner, D. Turner and M. Hulse, J. Microelectromech. Syst., 2004, 13, 472-483; B. Xu, W. M. Huang, Y. T. Pei, Z. G. Chen, A. Kraft, R. Reuben, J. T. M. De Hosson and Y. Q. Fu, Eur. Polym. J., 2009, 45, 1904-1911; E. Wornyo, K. Gall, F. Z. Yang and W. King, Polymer, 2007, 48, 3213-3225; F. Yang, E. Wornyo, K. Gall and W. P. King, Nanotechnology, 2007, 18; F. Z. Yang, E. Wornyo, K. Gall and W. P. King, Scanning, 2008, 30, 197-202; Y. C. Lu and D. M. Shinozaki, J. Eng. Mater.-T. ASME, 2008, 130, 7;

Temperature Gradient Stage: Specifications and Operation Guidelines, NIST Combinatorial Methods Center, 2005, accessed at http://polymers.msel.nist.gov/combi/Instrumentation/06%20Temperature %20Gradient %20Stage. pdf; C. E. Hoyle, T. Y. Lee and T. Roper, J. Polym. Sci., Part A: Polym. Chem., 2004, 42, 5301-5338; J. Park, Y. S. Kim and P. T. Hammond, Nano Letters, 2005, 5, 1347-1350.

Description Of the Related Art Section Disclaimer: To the extent that specific publications are discussed above in this Description of the Related Art Section, or elsewhere herein, these discussions should not be taken as an admission that the discussed publications (for example, technical/scientific publications) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, or elsewhere herein, they are all hereby incorporated by reference into this document in their respective entirety(ies).

BRIEF SUMMARY OF THE INVENTION

It is therefore a principal object and advantage of the present invention to provide a shape memory polymer that is able to respond to temperatures over a broad range.

In accordance with the foregoing objects and advantages, the present invention applies the concept of functionally graded materials (FGMs) to SMPs. Specifically, the present invention involves SMPs with spatially distributed transition temperatures and the methods to prepare such materials. The term, FGM, refers to any synthetic material that has spatially dependent compositions, microstructures and associated properties. The FGM concept has engaged a significant amount of research effort since its first introduction in the 1980s, with applications ranging from aerospace to tissue engineering. A variety of fabrication and processing techniques have been developed for polymeric FGMs, including UV polymerization with patterned photo-filters, photodegradation with a gradually removed mask, thermal curing in a temperature gradient, controlled interdiffusion of polymer bilayers, co-extrusion with specially designed gradient distribution and 2-dimensional mixing units, and extrusion followed by laminate molding. However none of these techniques has ever been applied to SMPs and the preparation of SMPs with functionally graded properties.

The new shape memory polymers may exist as films, coatings, or adhesives, and feature a continuous gradient of shape memory transition temperatures from one portion of the sample to another. As a consequence, thermally stimulated recovery of a temporary configuration to the permanent configuration occurs with spatial localization. In one embodiment where the special localization of transition temperature is in the form of a continuous gradient, the recovery can occur in a wavelike-fashion upon uniform heating with recovery beginning at the regions where the transition temperature is lowest and propagating in the direction of increasing transition temperature. The materials are achieved by one or more of the three general methods, one of which involves photocuring a glassy shape memory polymer within a temperature gradient, the researchers having discovered that the ambient temperature during photocure determines the final and local glass transition temperature, $T_g$. The second method involves photocuring at a temperature greater than the maximum $T_g$ allowable by the composition and through a mask with spatial grading of the optical absorbance. In this manner, the crosslinking (which controls $T_g$) develops at a rate that is spatially graded. The third method is similar to the second: photocuring at a temperature greater than the maximum $T_g$ allowable by the composition and through a mask that translates laterally during cure. In this manner, the region of sample first exposed during mask translation will feature the longest photocuring time and thus the highest $T_g$, whereas the regions further along in the direction of mask translation will experience less and less exposure time and thus a lower $T_g$. This $T_g$ becomes the local transition temperature in the functionally graded shape memory polymer articles. Envisioned applications are in simple, electronics-free temperature sensing in the form of labels or in complex deployment of mechanical structures wherein wave-like deployment is advantageous or required.

BRIEF DESCRIPTION OF THE DRAWING

The present invention will be more fully understood and appreciated by reading the following Detailed Description in conjunction with the accompanying drawings, in which:

FIG. 1A is a schematic illustrations showing a top view of a temperature gradient hot-stage according to an embodiment of the present invention;

FIG. 1B is a schematic illustration showing a side view of a temperature gradient hot-stage according to an embodiment of the present invention;

FIG. 1C is a photograph showing a top view of a temperature gradient hot-stage according to an embodiment of the present invention;

FIG. 1D is a photograph showing a side view of a temperature gradient hot-stage according to an embodiment of the present invention;

DETAILED DESCRIPTION OF THE INVENTION

Figures 2A, 2B:
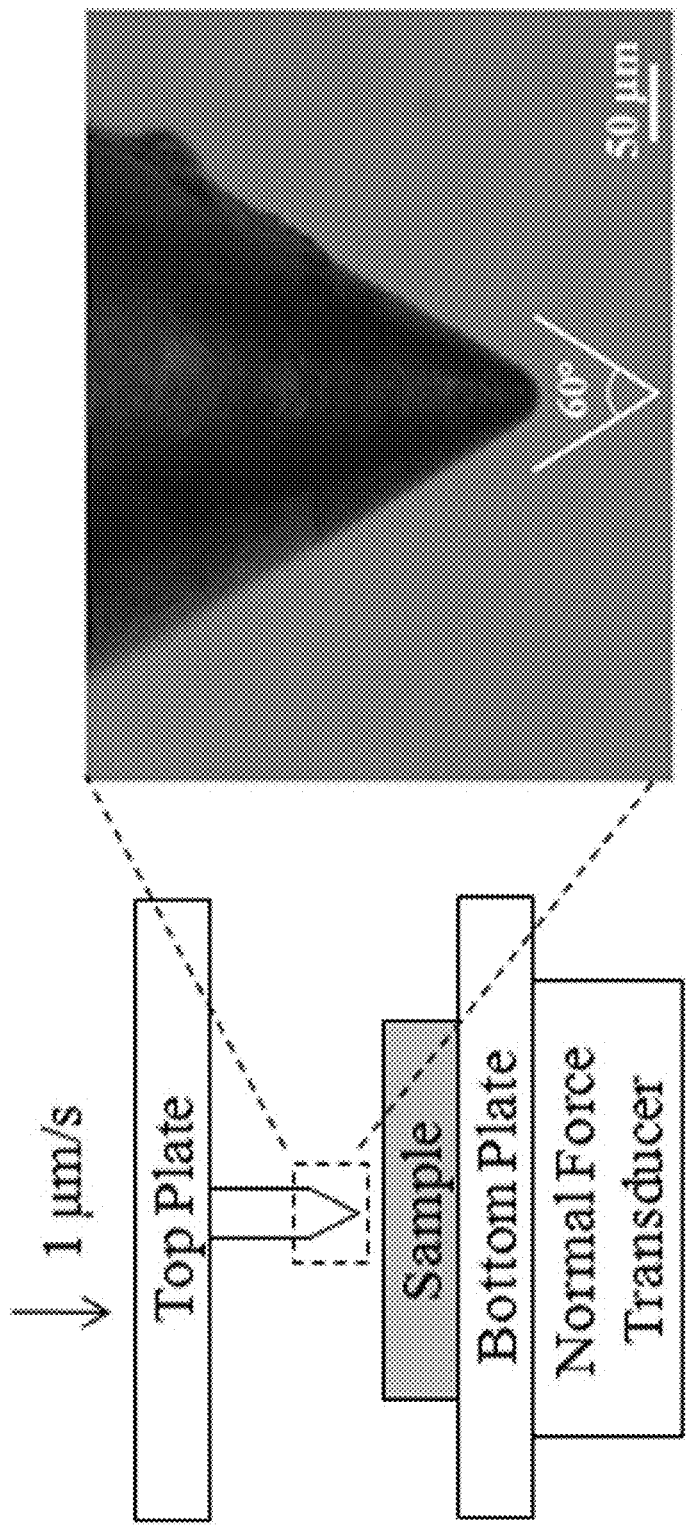
FIG. 2A is a schematic illustration of a micro-indication setup according to an embodiment of the present invention.
FIG. 2B is a photograph of a micro-indentation setup according to an embodiment of the present invention.

Referring now to the drawings, wherein like reference numerals refer to like parts throughout, SMPs according to the present invention include a spatially graded glass transition temperature. SMPs according to the present invention were technically achieved by post-curing the material (a thiol-ene based photo-crosslinkable glassy thermoset formulation) in a linear temperature gradient, allowing vitrification to occur at different temperatures along the gradient. The resulting material shows a one-dimensional gradient of glass transition temperatures ($T_g$'s) from $T_{min}$ to $T_{max}$. Therefore the material can respond to a range of temperatures, $T_{min}<T<T_{max}$, yielding a spatially dependent elastic modulus for a given temperature and a spatially dependent shape recovery response upon application of spatially uniform external heating.

To characterize the position-dependent shape memory properties, it is apparent that conventional, bulk characterization methods described above are not ideal since they are based on macroscopic deformations (tension, compression, or bending) that do not have required spatial resolution. Needed are microscopic deformations (with length scales that are smaller than the characteristic distance for $T_g$ to change with the gradient, $\delta=\Delta T_g/(dT_g/dx)$, with $\Delta T_g$ being the $T_g$ breadth) that fix and recover "locally" without interfering with each other. For properties of the present case, described below, $\delta\sim0.5$ mm. Consequently a good candidate for shape memory characterization is indentation, a method that has been applied to SMP research with micro- and nano-indentation by several authors. For a large variety of synthetic chemistries and compositions utilized among these studies, it was uniformly observed that excellent heat-induced recovery of vitrified indents occurs for all of the SMPs studied. Table 1 summarizing these studies is below:

TABLE 1

| Reference | Materials | Indenter Geometry | Indentation Temperature | Observation |
|---|---|---|---|---|
| Gall et al. | A commercial, two-part epoxy SMP with a $T_g = 67°$ C. (from loss tangent peak). The chemical composition is not disclosed. | Vickers indenter (four sided pyramid with a face angle of 136°) | Indented at 5 different temperatures, between $0.37T_g$ and $1.27T_g$ (c.a. 25 to 85° C.), then cooled to $0.37T_g$ (25° C.) for indent "fixing" | (1) Complete recovery was achieved regardless of indentation temperature; (2) Recovery temperatures increased with higher indentation temperatures. |
| Xu et al. | Glassy PU (MM5520 from Mitsubishi Heavy Industries) reinforced with thermally treated attapulgite clay $T_g$ of neat PU = 34.3° C. $T_g$ of nanocomposites ~40° C. | Vickers indenter (same as above) | Not mentioned; presumably at ambient temperature | (1) Complete recovery was observed for both neat PU and the nanocomposite; (2) Nanocomposite showed slower recovery kinetics. |
| Wornyo et al. | tBA photo-crosslinked with different amounts of DEGDMA and PEGDMA ($M_w$ = 550 g/mol) | Berkovich indenter | Indented at ambient temperature | Complete recovery was observed for all the samples with different crosslink densities; |
| Yang et al. | tBA photo-crosslinked with DEGDMA | A custom-made cantilever with a heated tip; tip geometry not specified | Indented at different tip temperatures of 150, 192 and 250° C.; two "cold indents" were also introduced by using a unheated tip | (1) All indents showed almost complete recovery upon heating; (2) The indents formed at room temperature recovered at lower temperatures. |

SMP: shape memory polymer; PU: polyurethane; tBA: tert-butyl acrylate; DEGDMA/PEGDMA: di-/poly-(ethylene glycol) dimethacrylate; $M_w$: molecular weight.

This led to an expectation that, among glassy SMPs, similar shape memory fixing and recovery for the indentation geometry should be possible. The analytical tools that have been used to monitor and quantify indentation recovery have included either profilometry or atomic force microscopy (AFM). While these tools have allowed for high spatial resolution for quantification of shape recovery, they are relatively slow and do not provide adequate time resolution of typical recovery events. We successfully utilized the photoelastic effect, observed using polarized optical microscopy (POM), to monitor and analyze indent recovery. Practically speaking, this can serve as a good readout method for the actual sensing applications.

Overall, our functionally graded SMP not only meets the requirements for temperature sensing, but also provides a potential route for precisely controlling the shape recovery profile; for example, directional shape recovery from one end to the other. Following is a description of the experimental protocols used for preparing and characterizing the functionally graded SMP. Then, detailed results and analysis showing the spatially graded shape memory properties are provided. Finally, the gradient shape recovery behavior of the material according to the present invention under continuous heating is demonstrated.

Advantages of the invention are illustrated by the following Example. However, the particular materials and amounts thereof recited in these examples, as well as other conditions and details, are to be interpreted to apply broadly in the art and should not be construed to unduly restrict or limit the invention in any way.

EXAMPLES

Fabrication of Temperature Gradient Hot Stage

A custom made temperature gradient hot stage was used to impart $T_g$ gradient to the SMP system, shown in FIG. 1. The stage was designed and fabricated following a technical guide published by NIST. A temperature gradient is produced by heating at one end (via a heating unit) and maintaining a constant low temperature (via a cooling unit) at the other end. The heating unit consists of a cartridge heater (output power=300 W, McMaster-Carr) and a temperature controller (ETR-9090 from OGDEN Manufacturing Company) with a type T thermocouple. The cooling unit functions by circulating cold water at a constant flow rate using a submersion pump (model 1C-MD-1, March MFG., Inc.). Thermal insulation between the entire apparatus and the laboratory table is provided by two machined Teflon blocks. Besides varying the temperatures of the heating and cooling units, the temperature gradient can be further controlled via adjusting the distance between both units by the use of two positioning slots. The actual temperature gradient was verified by measuring the temperatures at different positions using a thermometer (S1-II from Fluke Corporation).

Preparation of Functionally Graded SMP Samples

The SMP used is a commercial UV curable glassy thermoset (Norland Optical Adhesive 63 or NOA63), purchased from Norland Products, Inc. The liquid formulation is polymerized to a solid state via thiol-ene step-growth photopolymerization chemistry. Nevertheless, the exact chemical composition of this commercial product is unknown. Uncured NOA63 (a clear, viscous liquid) was first uniformly coated on a glass slide with a controlled thickness of 0.6 mm using a micrometer-based, doctor-blade film applicator (Gardco Microm-II from Paul N. Gardner Company, Inc.). Curing was carried out by exposing NOA63 to 365 nm UV irradiation (Spectroline SB-100P high intensity UV lamp) at room temperature (r.t.) for 1 h. This resulted in a NOA63 film with a single, uniform $T_g$ of c.a. 30° C. (measured by DSC). Although dynamic mechanical analysis of this polymer has been previously reported to better understand its use in nano-scale microcontact printing, it has not been previously reported as an SMP.

To introduce a $T_g$ gradient, the cured NOA63 film (on a glass slide) was placed on the temperature gradient plate and post-cured under the same UV source for an additional time of 1 h. More details are provided in the next section (Results and Discussion), as variations thereof caused systematic changes in the material behavior.

Thermal, Mechanical and Bulk Shape Memory Characterization

The thermal and mechanical properties of NOA63 were studied using differential scanning calorimetry (DSC) and dynamic mechanical analysis (DMA). For the former, a typical sample of 3-5 mg encapsulated in a Tzero aluminum pan, and examined using a TA Q200 DSC (TA Instruments, Inc.). The temperature was first ramped from 40° C. to 80° C., then cooled back to −60° C., and finally ramped to 80° C. while collecting the heat flow data. Both heating and cooling rates were 10° C./min. The $T_g$ was determined as the mid-point of the step transition in heat flow during the 2nd heating. For DMA, a rectangular film (7.24 mm*3.56 mm*0.19 mm) was loaded under tension on a TA Q800 dynamic mechanical analyzer (TA Instruments, Inc.). An oscillatory deformation with an amplitude of 15 µm, a frequency of 1 Hz, and a "force track" (ratio of static to dynamic force) of 115% was applied while ramping the temperature from −90° C. to 100° C. at 3° C./min.

Figure 9:
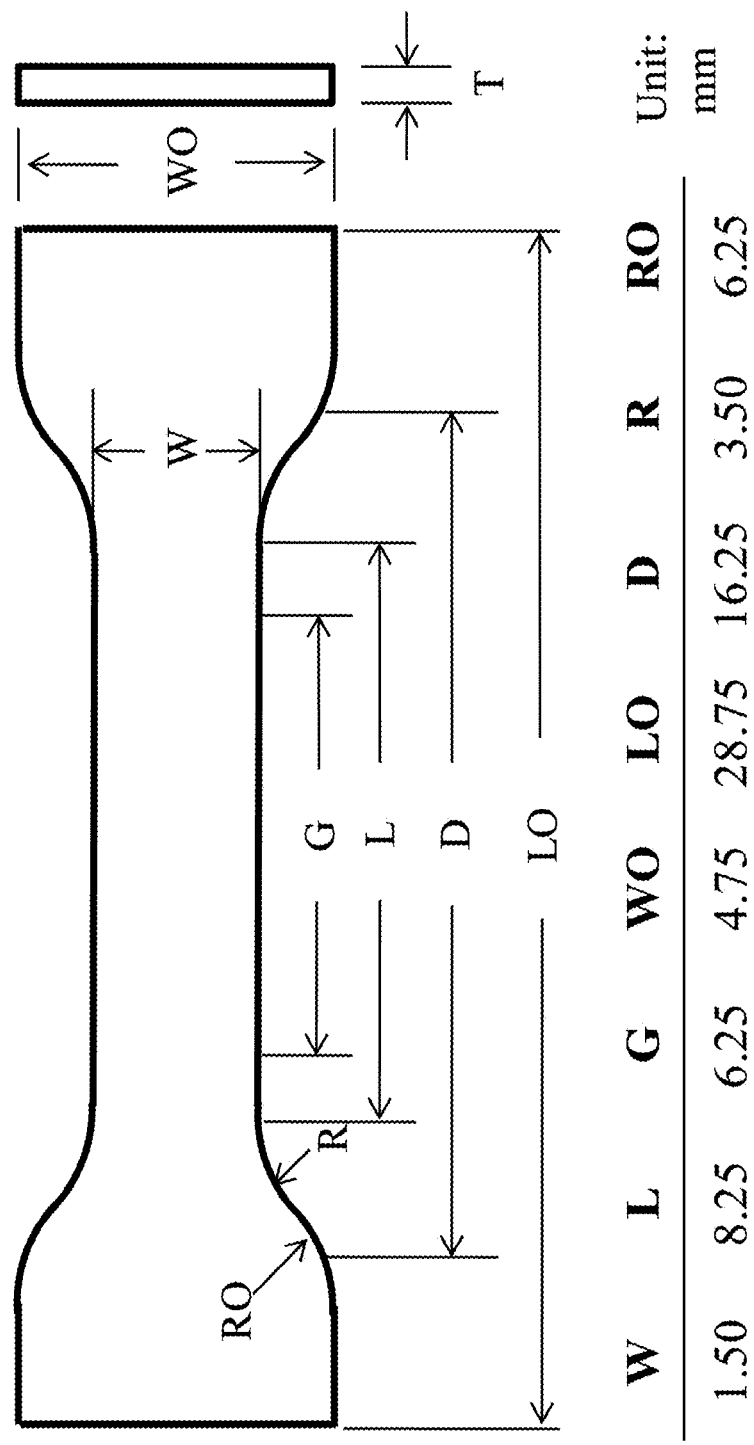
FIG. 9 is a schematic of the dumbbell geometry used for bulk shape memory characterization, where W: width of narrow section, L: length of narrow section, G: gage length, WO: width overall, LO: length overall, D: distance between grips, R: radius of fillet, and RO: outer radius, according to an embodiment of the present invention.
Figure 10:
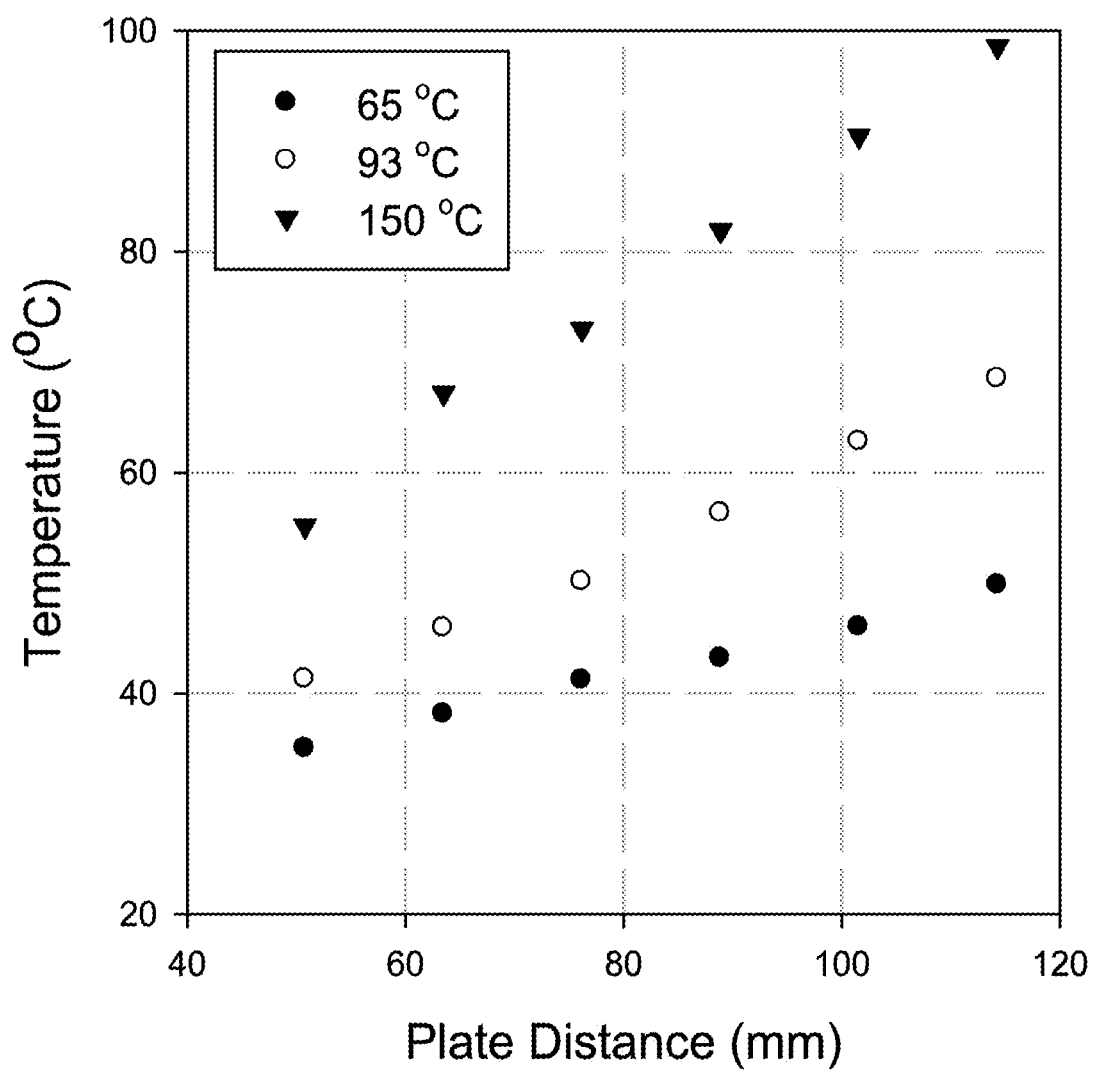
FIG. 10 is a graph of the temperature—distance plots for different temperature gradients generated by varying the heater temperature, according to an embodiment of the present invention.

The bulk shape memory of cured NOA63 was characterized using a well established four-step thermomechanical cycling method, referred to as the one-way shape memory (1WSM) cycle. Since this involved large-strain tensile deformation, a dumbbell geometry guided by ASTM D638, as seen in FIG. 9, was used successfully avoiding sample failure at the grips that often plagues thin film SMP testing. Film thicknesses of 0.16 mm were utilized. Each sample, loaded under tension, was: (1) stretched to a tensile strain of 31% by ramping the force to 0.5 N (corresponding to a stress of 2 MPa) at a constant rate of 0.05 N/min at 70° C. (T>$T_g$), (2) cooled back to 20° C. (T<$T_g$) followed by an isothermal hold for 10 min, (3) unloaded by ramping the force to 0.01 N at the same rate of 0.05 N/min to witness strain fixing and (4) heated to 70° C. to allow strain recovery under no constraint. The same procedure was then repeated for two more times to assess the deterioration in shape memory performance, if any, as a result of thermomechanical cycling. To further analyze the shape memory results, fixing ratio (Rf) and recovery ratio (Rr) were calculated according to:

$$R_f(N) = \frac{\varepsilon_u(N)}{\varepsilon_r(N)} \times 100\% \quad (1)$$

$$R_r(N) = \frac{\varepsilon_u(N) - \varepsilon_p(N)}{\varepsilon_u(N) - \varepsilon_p(N-1)} \times 100\% \quad (2)$$

Here εm, εu, εp and N stand for the strain before unloading, the strain after unloading, the permanent strain after heating (strain that is not recovered) and the cycle number, respectively. For cycle 1 (N=1), εp(0) is taken as the initial strain at the onset of the experiment.

Micro-Indentation of Functionally Graded NOA63

A post-cured NOA63 was cut evenly into 10 separate pieces along the length ($T_g$ gradient) direction. Samples were spaced by 2 mm or a $T_g$ difference of about 0.5° C. Each piece was then indented on a rheometer (ARG2, TA Instruments) using the gap-control feature of the instrument and normal force transducer, along with a custom-assembled indenter setup (FIGS. 2A-B). The indenter tip was made from a Pfanstiehl diamond stylus (352-D7 from KAB Electro Acoustics) with a well defined conical geometry (Scheme 2; tip radius ~25 µm), bonded to the center of a 25 mm disposable aluminum plate. The sample, placed on the bottom plate, was indented at 80° C. (T>$T_g$; temperature controlled by a thermal chamber, known as the environmental testing chamber or ETC on the above mentioned rheometer) by bringing the indenter tip (or top plate) down at a constant speed of 1 µm/s until a maximum normal force of 0.4 N was reached. Then, the sample was quickly cooled (10° C./min) to 25° C. (T<$T_g$) while holding the normal force constant. The normal force was finally released by raising the indenter (top plate) away from the sample at 1 μm/s.

Indent Recovery and Image Analysis Method

As mentioned above, the strain field induced by indentation could be visualized semi-quantitatively as birefringence based on the photoelastic effect. When heated, the birefringence would disappear in sync with the stress field and (for SMPs with good recovery) the strain field. At the molecular level this is due to the oriented polymer chains relaxing back to their thermodynamically favored random coil confirmations. Experimentally this was monitored by an Olympus BX51 optical microscope with crossed polarizer and analyzer, coupled with an Instec HCS402 hot-stage. Digital micrographs (24 bit color) were taken every 30 s by a QICAM FAST-1394 CCD camera while heating the sample from 25° C. to 65° C. at a linear heating rate of 2° C./min.

Figure 4:
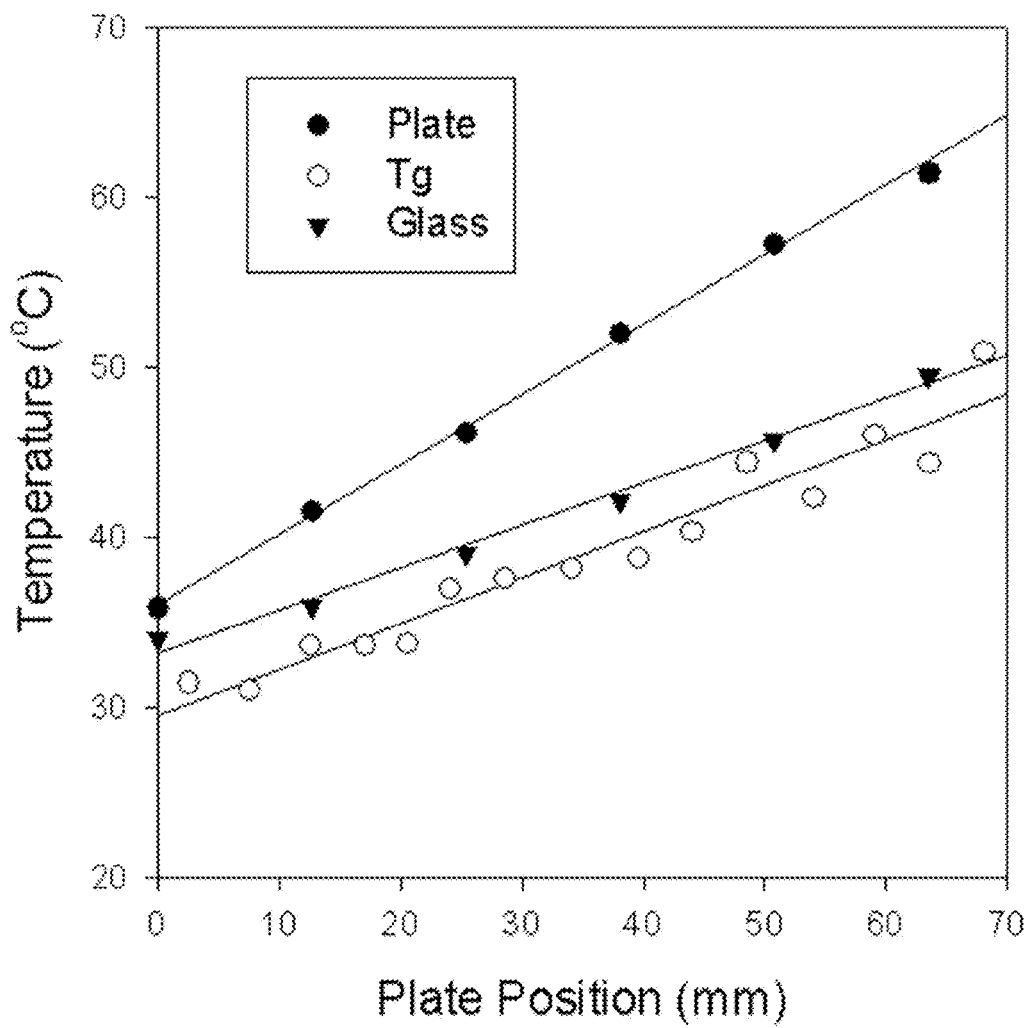
FIG. 4 is a graph of the temperature vs. position plots for the temperature gradient hot-stage (●), the glass slide (○) and the $T_g$'s (measured by DSC) on the final NOA63 film (▼), where the temperature of the "heater" end was set to be 120° C. (see FIG. 1) while ice-water circulation was maintained at the "cooler" end, according to an embodiment of the present invention.

The digital images were then converted to 8 bit grayscale using Photoshop CS2. The histogram of each image was analyzed to obtain the average pixel intensity (Ī) by dividing the overall greyscale intensity (integration of the histogram) by the total number of pixels, using a constant region of interest (ROI) area of 1160 μm*870 μm which covers the entire birefringence zone (as shown in FIG. 4). The Ī of the last image (the one taken at 65° C.) was used as the background noise ($I_B$) to calculate the normalized intensity ($I_N$):

$$I_N = \frac{\bar{I} - I_B}{I_o - I_B} \times 100\% \quad (3)$$

where $I_o$ is the of the first (25° C.) image. The normalized intensity, $I_N$, was then plotted as a function of temperature for each sample, quantifying indentation recovery temperature and breadth with spatial resolution achieved by the small indenter size.

Demonstration of Gradient Shape Recovery

To further demonstrate the gradient shape recovery behavior, a functionally graded NOA63 film was prepared, with dimensions of 7.5 cm (length)*2.3 cm (width)*0.28 mm (thickness). A series of cuts spaced along the $T_g$-gradient (length) direction were cut through the film thickness and along the film width direction using a razor blade. The cuts started from the edge and ended around the center of the film width (1.1-1.2 cm long), and were 5 mm apart from the adjacent ones. The sample was then heated at 80° C., folded along its "center line" (parallel to the film length), and cooled to room temperature to fix the deformation. A Pelletier plate (an accessory of the ARG2 rheometer) was used to uniformly heat the material and trigger its recovery. For this purpose, the deformed sample was placed on the Pelletier system, with the "virgin" (uncut) half-surface actually touching the Pelletier plate. A glass slide was put on top of the virgin half-surface to enhance thermal contact. With this configuration, the recovery of each "finger" (the area between two adjacent cuts) can occur without much mechanical constraint, or under a relatively stress-free condition. In other words, the recovery of each finger is not affected by the recovery of the adjacent fingers, and is solely determined by its localized $T_g$ (the average $T_g$ of that finger). The temperature was linearly ramped from 25° C. to 60° C. at 2° C./min with images taken every minute (or every 2° C.) using a digital camera.

Results and Discussion of Examples

Figures 3A, 3B:
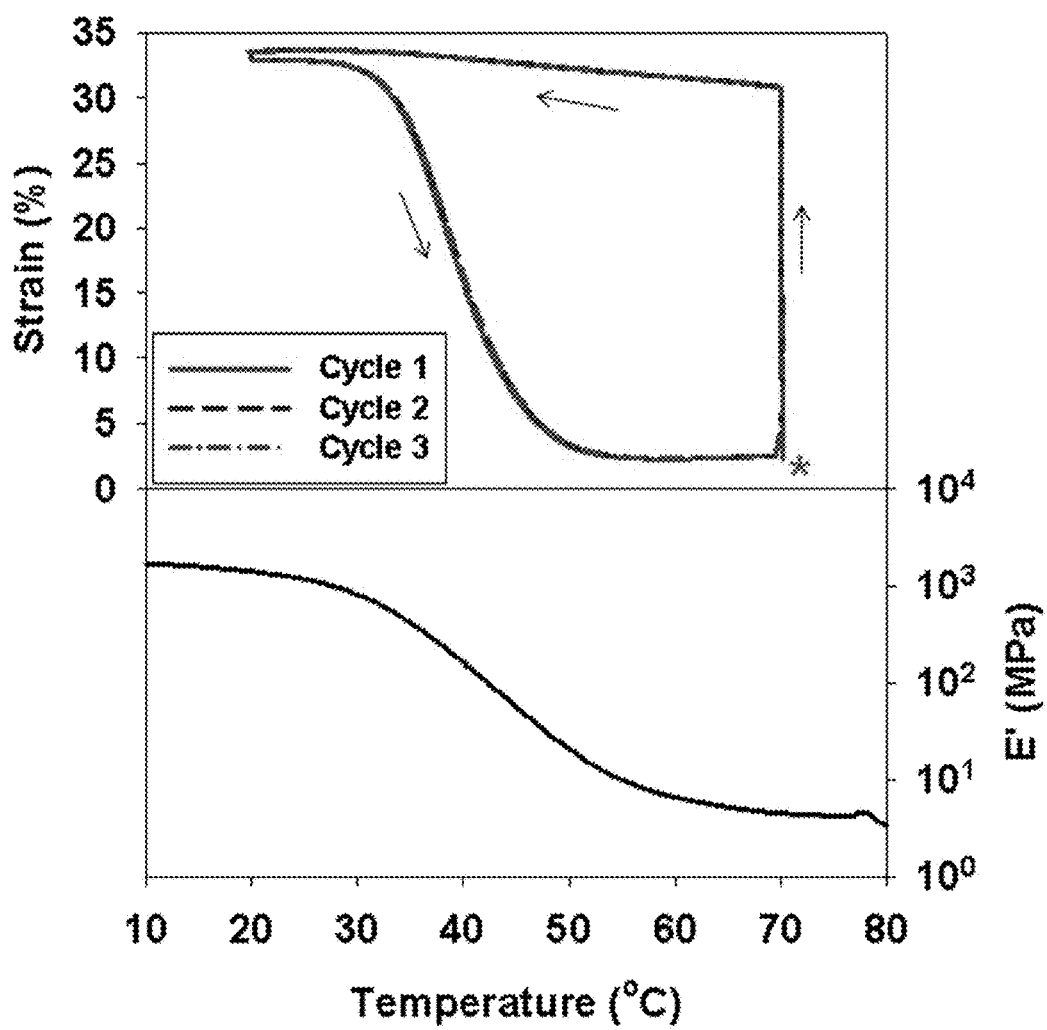
FIG. 3A is a graph of the bulk 1WSM cycles (the asterisk indicates experimental onset) according to an embodiment of the present invention.
FIG. 3B is a graph of the temperature dependent DMA result of cured NOA63 (no post-cure) according to an embodiment of the present invention.

Cured NOA63 is a transparent, glassy solid that has excellent shape memory properties as shown in FIGS. 3A-B. In this case the material was cured under UV for 1 h at r.t. (the actual temperature was ~5° C. higher due to the heating effect of UV irradiation) without any further post-cure and shows a uniform $T_g$ of 29.7° C. (determined from the onset of E drop). It is observed from the 1WSM cycles (FIG. 3A) that, a large percentage of strain was fixed after unloading at 20° C., corresponding to an Rf of 98.4% (averaged over three cycles; the same below for Rr). The fixed strain recovered almost completely (Rr=99.7%) in a relatively small temperature range during heating. Furthermore, the shape memory performance showed no deterioration up to three cycles, in that all the curves follow almost exactly with each other. This indicates good thermal stability of cured NOA63.

The $T_g$ of cured NOA63 was found to increase in response to post-photocure at higher temperatures. This can be interpreted based on reaction kinetics. When NOA63 is being photo-cured, the $T_g$ increases with conversion until it reaches the environmental temperature, $T_e$. Vitrification (transition from rubbery to glassy state) takes place which significantly limits the reaction rate due to reduced chain mobility/diffusion. When the environmental temperature is raised to $T_e$ ($T_e > T_g$); however, the polymer chains re-enter the rubbery state and the residual reaction resumes, until the material $T_g$ reaches $T_e$ or $T_u$, whichever is lower. Here, $T_u$ is the ultimate $T_g$ the material can potentially reach (determined by network chain composition) at 100% conversion. Therefore the material $T_g$ can be controlled precisely by controlling $T_e$, as long as $T_e$ is lower than $T_u$. In this sense, the method of the present invention is not expected to work for semicrystalline networks (Class II SMPs1), which are thermally or photocured well above the vitrification point. It is also worth noting that in the specific case of NOA63, we found that heat and UV irradiation are both required to raise the $T_g$. Heat by itself does not change the $T_g$ tangibly. This is evident from the 1WSM cycles in FIGS. 3A-B: if heating were to change the $T_g$, the recovery transitions of the second and third cycles would have shifted to higher temperature, rather than staying almost constant. This is understandable since NOA63 polymerizes via a free radical mechanism, and UV is the only means to generate free radicals (by the decomposition of remaining UV initiators) in the system.

Based on the above discussions, post-curing NOA63 on a temperature gradient would therefore introduce a $T_g$ gradient on the material. For this purpose, a temperature gradient hot-stage was fabricated. By controlling the heating (via a cartridge heater) at one end and cooling (via cold water circulation) at the other end, a series of linear temperature gradients can be easily produced (FIGS. 1A-D). For the post-curing of NOA63, we utilized a linear temperature gradient from 36 to 65° C. along the sample length (70 mm; filled circles in FIG. 4). The actual temperatures at the glass slide surface (temperatures NOA63 was actually experiencing) were also measured and a large "damping" effect was observed, which reduced the temperature gradient from 36-65° C. to 33-51° C. (hollow circles in FIG. 4). The DSC-measured sample $T_g$'s closely matched the glass slide temperatures and spanned from 30 to 48° C., or a gradient of 2.7° C./cm. This also proved that the reaction was indeed vitrification-limited.

Figure 5:
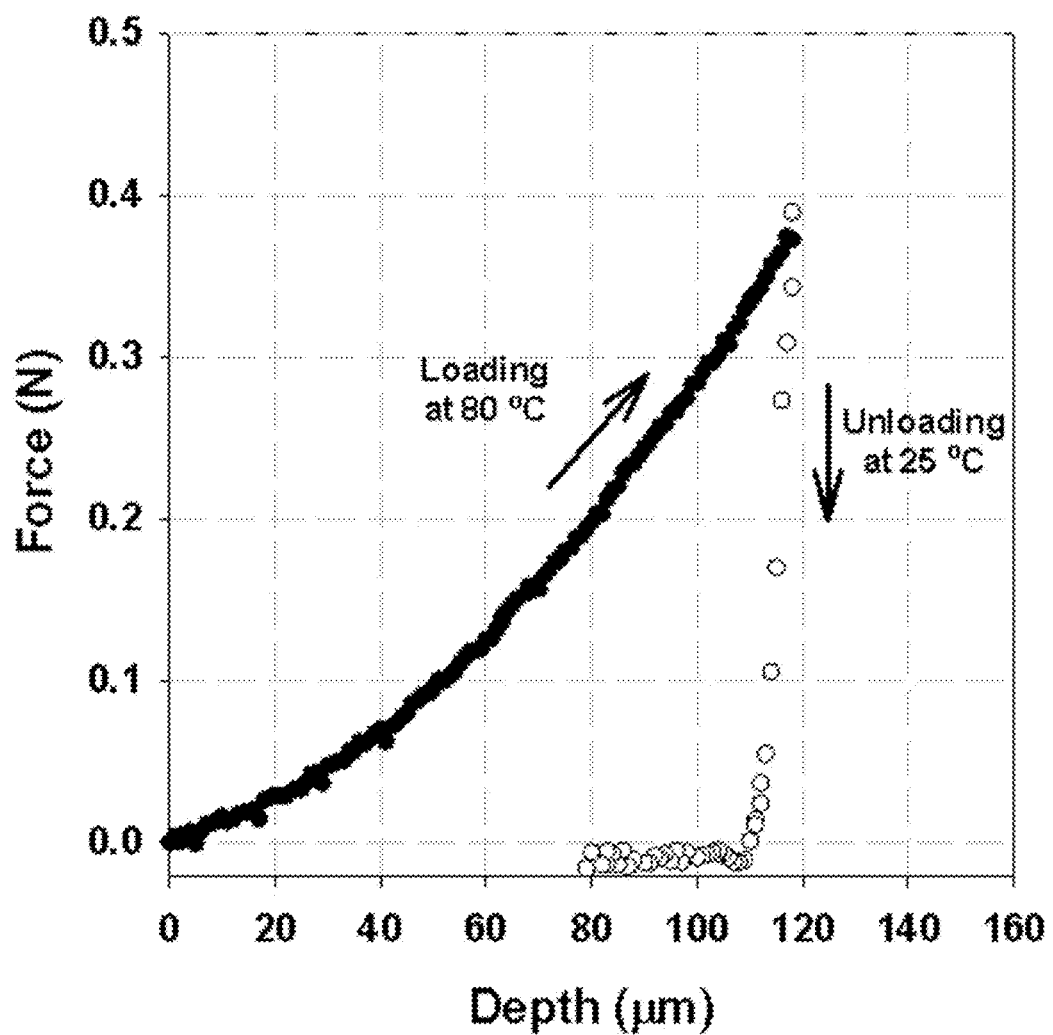
FIG. 5 is a graph of the force vs. depth curves showing the loading step at 80° C. (●) and the unloading step at 25° C. (○) for sample 9 (see text as well as FIG. 7), according to an embodiment of the present invention.
Figure 6:
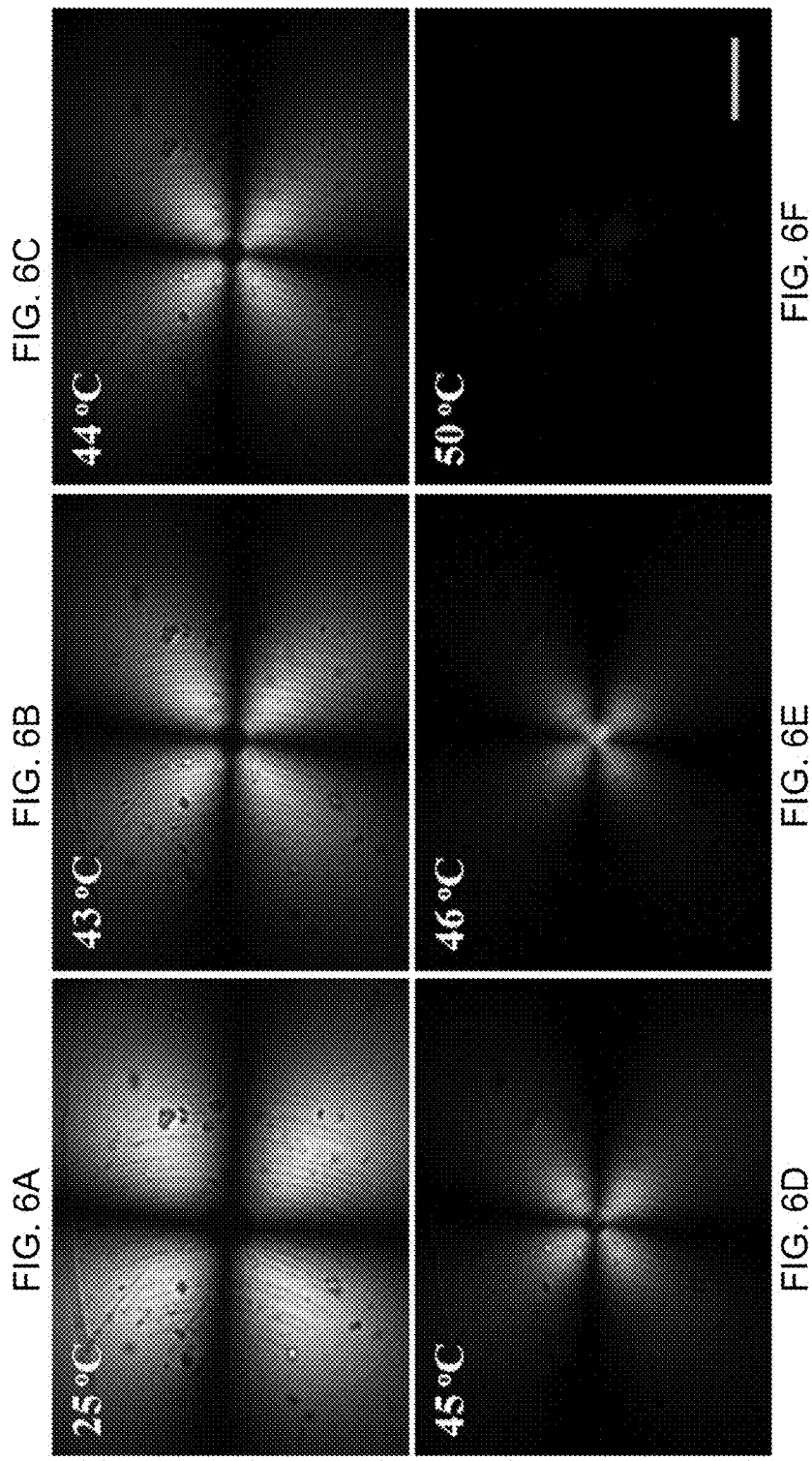
FIG. 6A is a polarized optical microscope (POM) image showing the recovery of an indent during heating, the scale bar represents 200 µm, according to an embodiment of the present invention.
FIG. 6B is a polarized optical microscope (POM) image showing the recovery of an indent during heating, where sample 9 is shown (see text as well as FIG. 5) which has a DSC-measured $T_g$ of 43° C. and the scale bar represents 200 µm, according to an embodiment of the present invention.
FIG. 6C is a polarized optical microscope (POM) image showing the recovery of an indent during heating, the scale bar represents 200 μm, according to an embodiment of the present invention.
FIG. 6D is a polarized optical microscope (POM) image showing the recovery of an indent during heating, the scale bar represents 200 μm, according to an embodiment of the present invention.
FIG. 6E is a polarized optical microscope (POM) image showing the recovery of an indent during heating, the scale bar represents 200 μm according to an embodiment of the present invention.
FIG. 6F is a polarized optical microscope (POM) image showing the recovery of an indent during heating, the scale bar represents 200 μm, according to an embodiment of the present invention.
Figure 11:
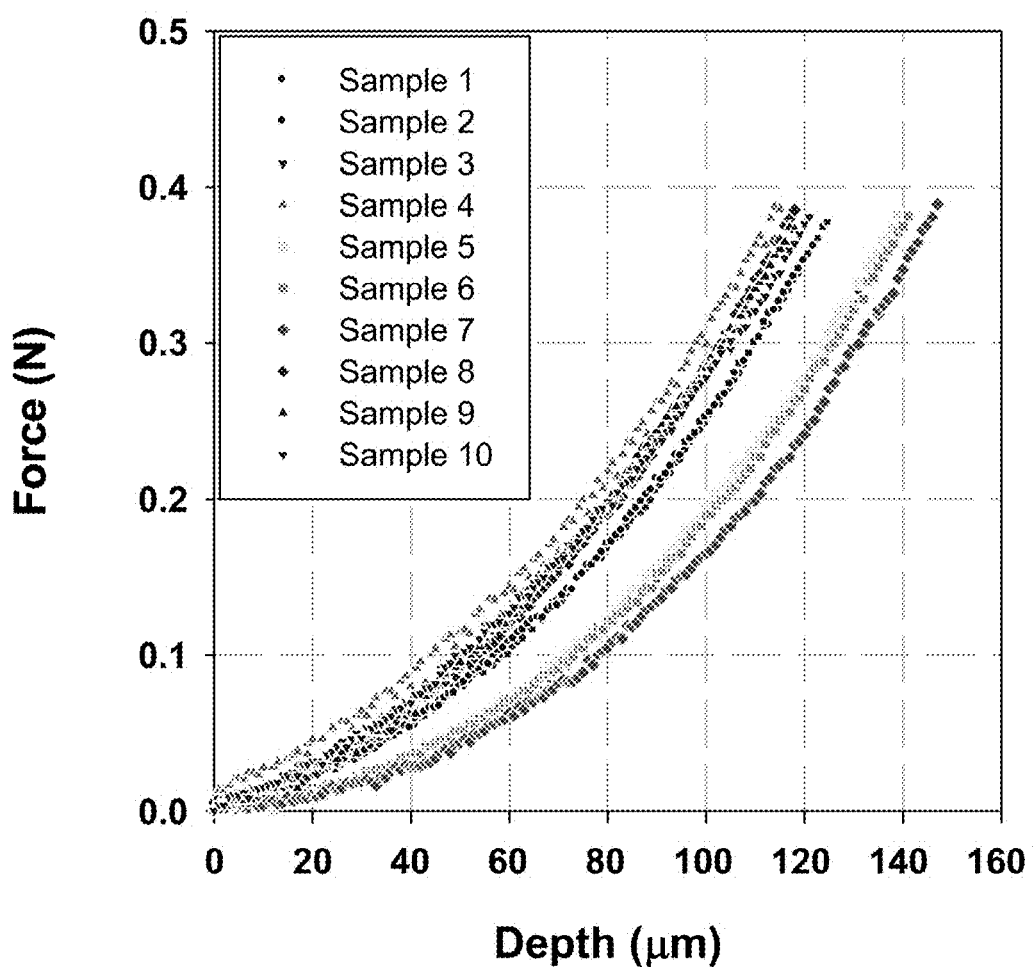
FIG. 11 is a graph of the indentation force—depth results for gradient samples 1-10, according to an embodiment of the present invention.
Figure 12:
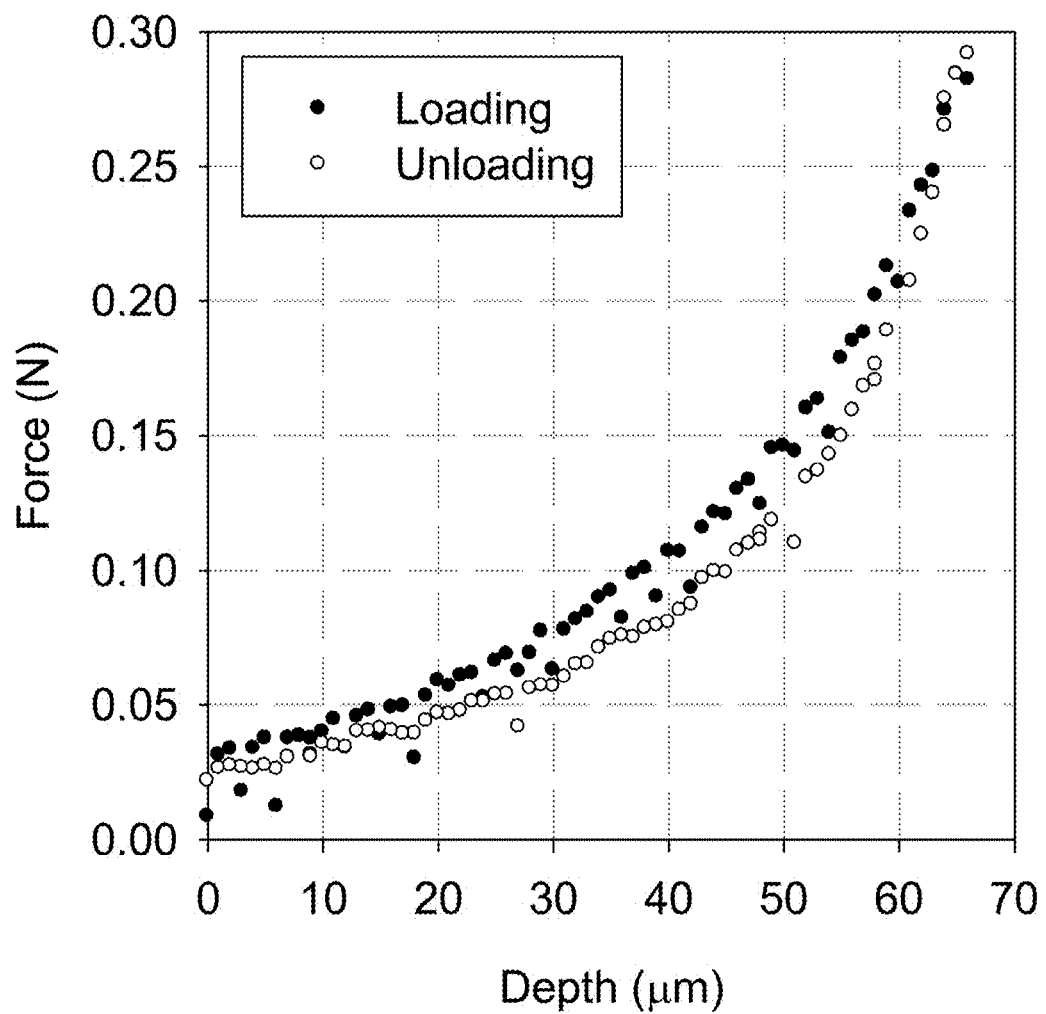
FIG. 12 is a graph of the loading-unloading curves for NOA63 indented at $T>T_g$, according to an embodiment of the present invention.
Figure 13A:
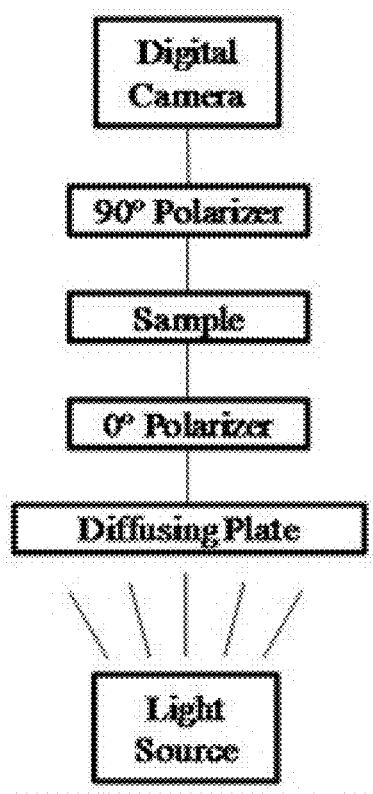
FIG. 13A is a schematic representation showing a digital camera, a 90 degree polarizer, a sample, a 0 degree polarizaer, a diffusing plate, and a light source according to an embodiment of the present invention.
Figure 13B:
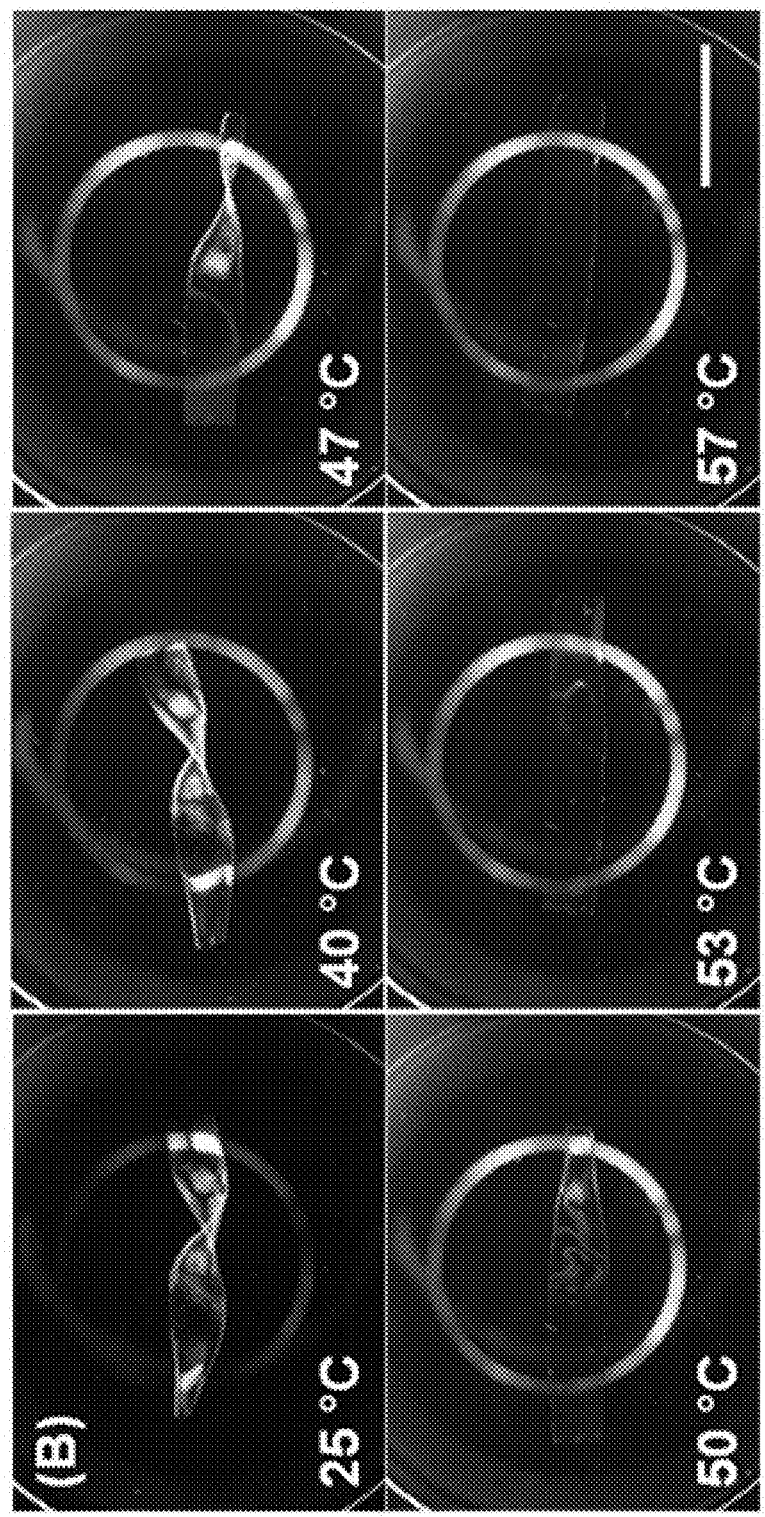
FIG. 13B shows a related series of photographs showing birefringence (photoelasticity) based demonstrations of gradient recovery according to the present invention.
Figure 13C:
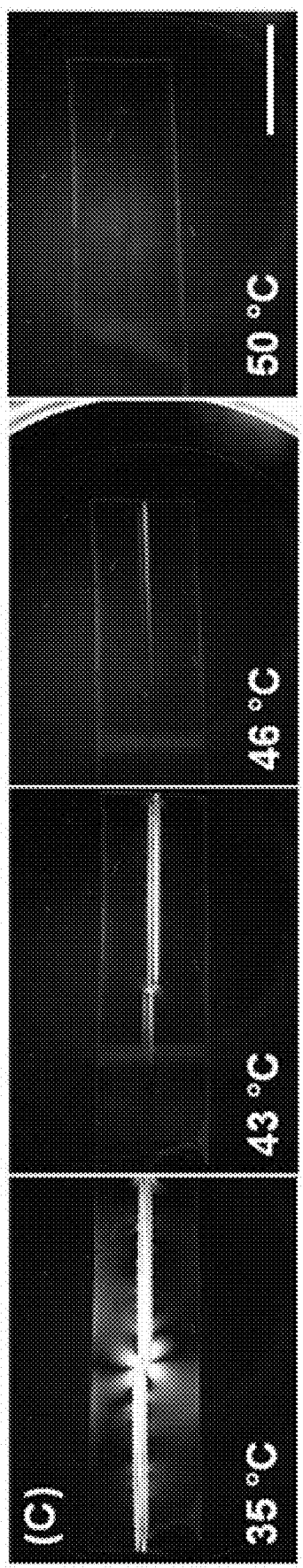
FIG. 13C shows a related series of photographs showing birefringence (photoelasticity) based demonstrations of gradient recovery according to an embodiment of the present invention.

To study the functionally graded shape memory properties, another post-cure was carried out and the resulting film was evenly cut into 10 samples along the gradient direction, as described above. The samples are referred to as sample 1 to 10, where the sample numbers increase with decreasing $T_g$, as will be shown. Each sample was indented to a maximum normal force of 0.4 N at 80° C. This resulted in a penetration distance, or an indent depth of c.a. 120 µm as shown in FIG. 5 (for clarity only the sample 9 is shown in FIG. 5; but other samples are shown in FIG. 11). Since the material existed in its rubbery state (80° C.>>$T_g$), the deformation was primarily elastic. This is supported by the experimental observation that the loading and unloading yielded very similar force-depth curves with minimal hysteresis, as further seen in FIG. 12. Microscopically, this deformation led to conformational changes (orientation) of the polymer chain segments. Similar to the fixing of a macroscopic deformation shown in FIGS. 3A-B, the indented sample was cooled to 25° C. while holding the force constant. During cooling, the polymer went through its $T_g$ and as a result, the conformational changes of chain segments were "frozen" due to a significant decrease of mobility and the indent was "fixed". The latter can be seen from FIG. 5 in that the depth decreased only slightly from 118 to 110 µm after unloading at 25° C. In other words 93.2% of the deformation was fixed.

The indent was then visualized under POM, and a classical "four-leaf" birefringent pattern could be observed (FIGS. 6A-F), which reflects the strain field surrounding the indent. When heated, both the intensity and the total area of the pattern decreased gradually with temperature. The image became eventually dark, indicating the fact that the strain had fully recovered, and all the chain segments had relaxed back to their thermodynamically favored random coil conformations.

Figure 7:
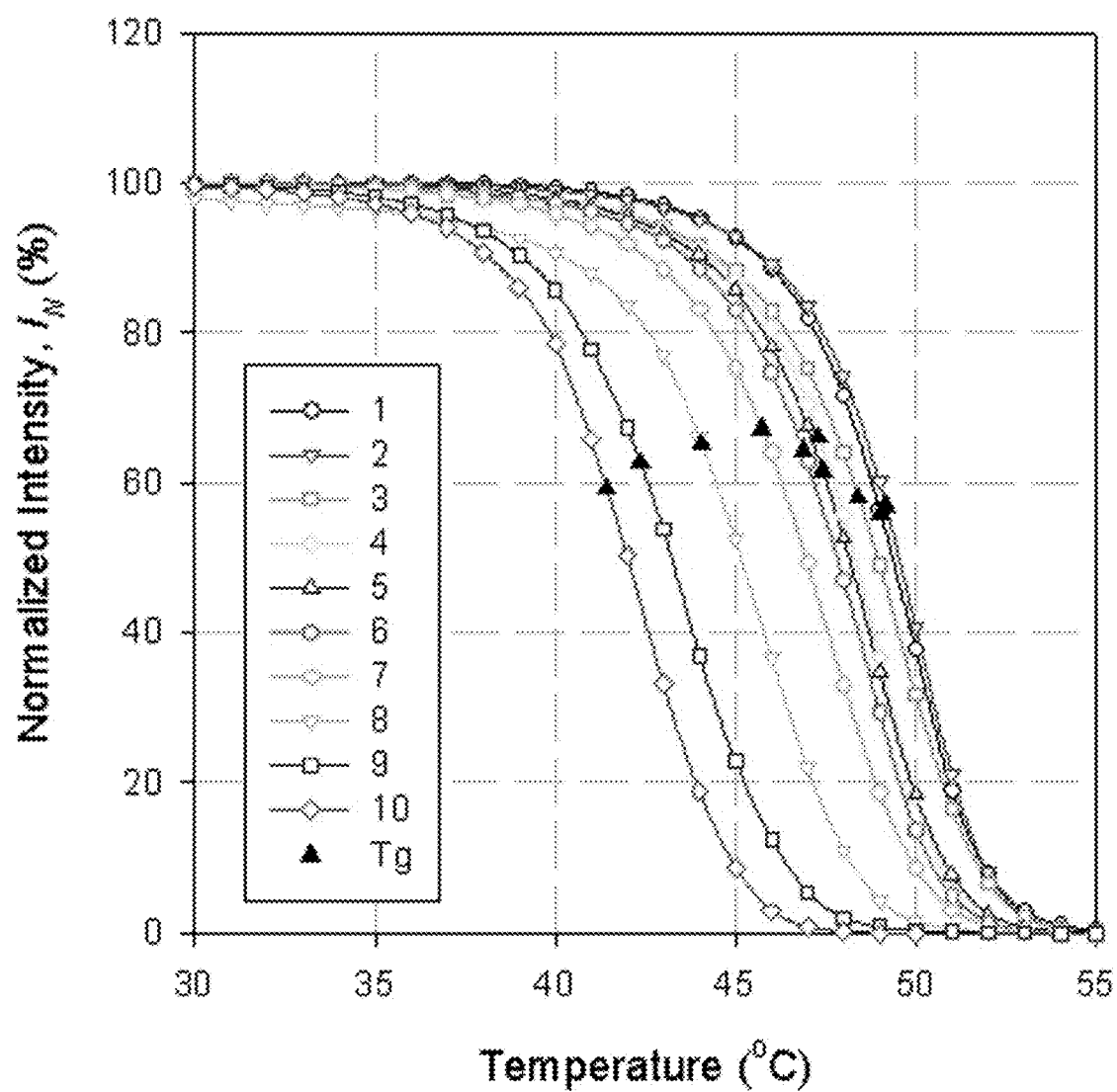
FIG. 7 is a graph of the indent recoveries, shown as the normalized birefringence intensity (%) vs. temperature (° C.) plots, for samples 1-10 (see text for details), where the filled triangles stand for DSC-measured $T_g$'s for all the samples, according to an embodiment of the present invention.

The indent recovery was further studied by image analysis, in which the normalized intensity of each image was plotted as a function of temperature for samples 1 to 10 (FIG. 7). The DSC-measured $T_g$'s for each sample are also indicated on the graph (black triangles in FIG. 7). For all the samples, a sigmoidal-like recovery profile similar to the recovery of macroscopic deformation (FIGS. 3A-B) was seen. It is clear that the indent recovered at higher temperatures with increased $T_g$'s, and the DSC-measured $T_g$ always corresponded to the temperature with a normalized intensity of c.a. 60% (or 40% of the intensity recovery).

Figure 8:
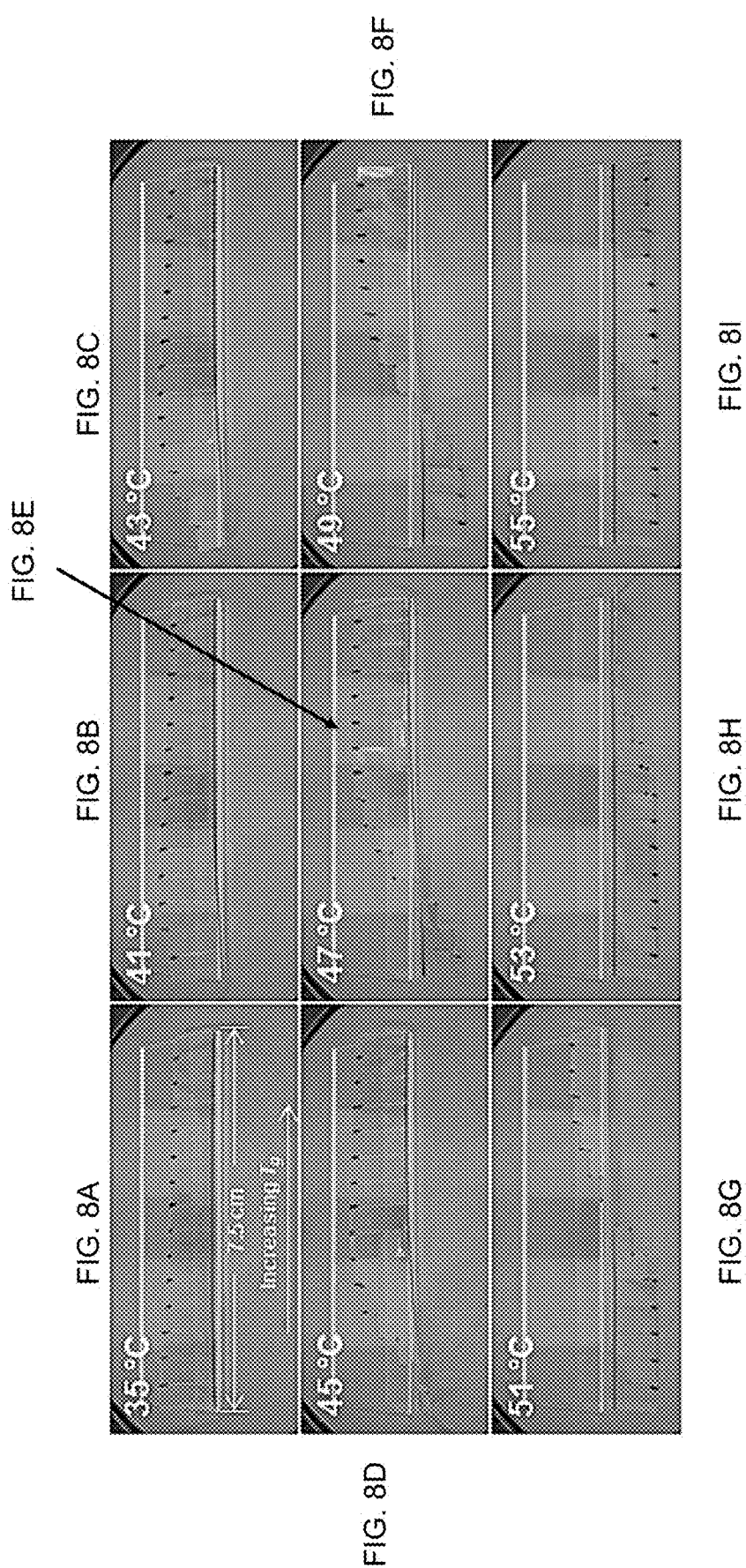
FIG. 8A is a photograph that provides a visual demonstration of the gradient recovery behavior of a functionally graded NOA63, where the left to right arrow indicates the direction of $T_g$ gradient according to an embodiment of the present invention.
FIG. 8B is a photograph that provides a visual demonstration of the gradient recovery behavior of a functionally graded NOA63 according to an embodiment of the present invention.
FIG. 8C is a photograph that provides a visual demonstration of the gradient recovery behavior of a functionally graded NOA63 according to an embodiment of the present invention.
FIG. 8D is a photograph that provides a visual demonstration of the gradient recovery behavior of a functionally graded NOA63 according to an embodiment of the present invention.
FIG. 8E is a photograph that provides a visual demonstration of the gradient recovery behavior of a functionally graded NOA63 according to an embodiment of the present invention.
FIG. 8F is a photograph that provides a visual demonstration of the gradient recovery behavior of a functionally graded NOA63 according to an embodiment of the present invention.
FIG. 8G is a photograph that provides a visual demonstration of the gradient recovery behavior of a functionally graded NOA63 according to an embodiment of the present invention.
FIG. 8H is a photograph that provides a visual demonstration of the gradient recovery behavior of a functionally graded NOA63 according to an embodiment of the present invention.
FIG. 8I is a photograph that provides a visual demonstration of the gradient recovery behavior of a functionally graded NOA63 according to an embodiment of the present invention.

This gradient recovery behavior was further demonstrated in a macroscopically visible manner. The experimental details were described above and the result is shown in FIGS. 8A-I. The material has an increasing $T_g$ from left to right, as the arrow in FIG. 8A indicates. For this sample, the $T_g$ varied from ca. 30° C. on the left-hand side to 50° C. on the right hand side, while the gradient was "sampled" by slicing along the gradient direction to give 15 "fingers" along the bottom edge, each marked on its terminus with a black dot. In this configuration, each finger featured $T_g$ variation<1.5° C. Uniform heating was provided by the Pelletier plate on which the sample was placed. The plate temperature was linearly ramped from 25° C. to 60° C. at 2° C./min. As anticipated, the recovery initiated at the left end (where the $T_g$ was lowest) and propagated to the right with increasing temperature.

Finally, the potential applications of functionally graded SMPs are considered for temperature sensing. A material with a known one-dimensional $T_g$ gradient (such as the graded NOA63 presented in this paper) can be fixed thermomechanically with localized deformations, such as a series of evenly spaced indents along the gradient direction. Heating such a specimen to a temperature T within its $T_g$ range (between $T_{min}$ and $T_{max}$) would result in the recovery of indents located between $T_{min}$ to T but not $T_{min}$ to $T_{max}$.

Therefore examining the recovery profile by some means would allow the precise determination of T. Considering d to be the spatial resolution of indentation recovery detection, the temperature sensing resolution, ΔT, is then given by either $(d \times dT_g/dx)$ if d≥δ (δ being the characteristic distance defined in Introduction), or $(\delta \times dT_g/dx)$ if d<δ. In the former case, the sensing resolution can be enhanced (lowering ΔT) by reducing the temperature gradient $dT_g/dx$. This can, in turn, be controlled by the external temperature gradient, as shown in FIG. 4. In the latter case, since $\delta = \Delta T_g/(dT_g/dx)$ ($\Delta T_g$ being the $T_g$ breadth), the above expression becomes $\Delta T = \Delta T_g$. This indicates that the sensing resolution is material-limiting when d<δ. Therefore the only way to enhance the resolution would be to reduce $\Delta T_g$.

Due to the simplicity of the presented material and fabrication method, the production of low-cost "temperature labels" are possible that could be utilized to measure temperatures in areas that are not accessible by conventional methods or not amenable to continuous monitoring, to indirectly indicate sterilization completion, or for incorporation into product packaging (for shipping industry or food storage) to indicate the maximum temperature of product exposure. For example, temperature sensing labels wherein packaging for thermally sensitive and valuable materials (drugs, chemicals, food, etc) may be labeled with an embossed or otherwise "fixed" functionally graded shape memory polymer. Visual inspection of the received package label will indicate the highest temperature that the package experienced in transit. In addition, the present invention may be used for complex structure deployment where the prescribed transition temperature enables activation from one position continuously to the other for smoothness of operation. Finally, the present invention may be used for local temperature sensing of surgical tools during sterilization where, if the sensing label incorporating the present invention does not indicate a target sterilization temperature, then a user is alerted that the tools did not get sterilized.

General Methods for Preparing Functionally Graded Shape Memory Polymers (FG-SMP)

Figure 14:
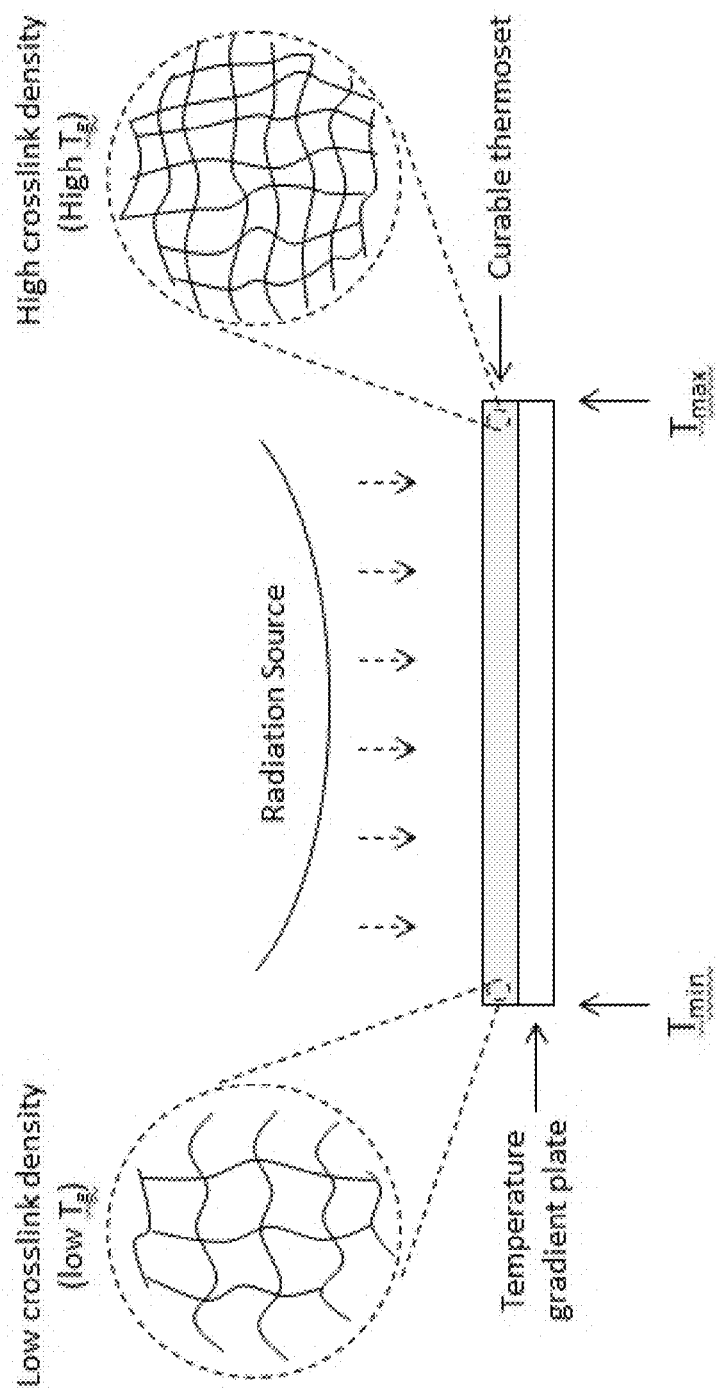
FIG. 14 is a schematic representation of a temperature gradient cure method of preparing functionally graded shape memory polymer products, according to an embodiment of the present invention.
Figure 15:
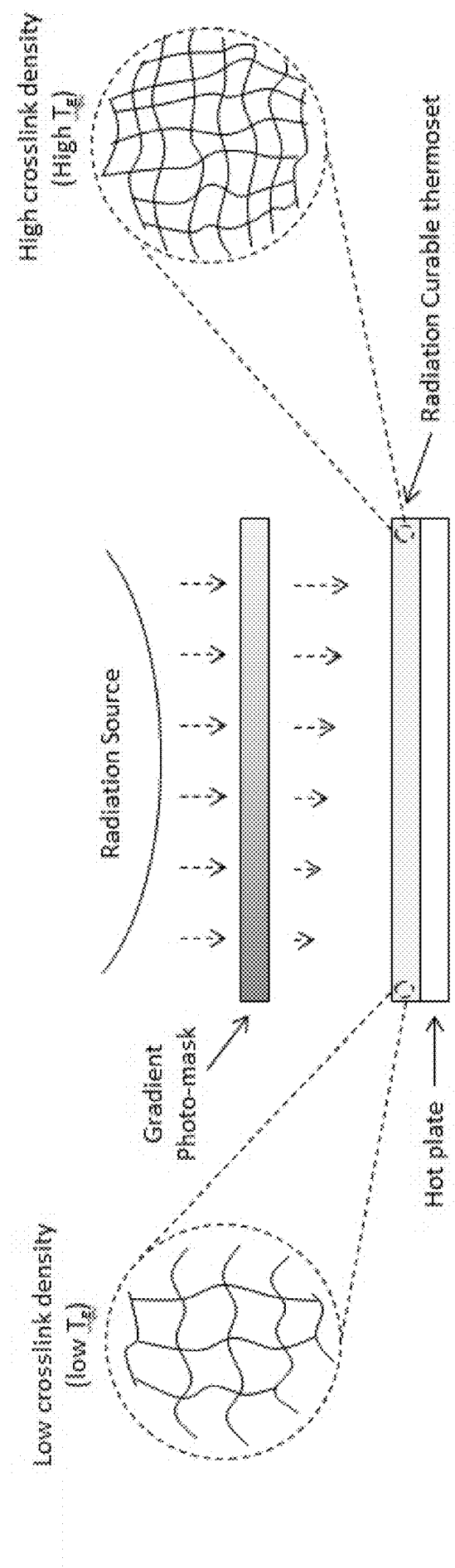
FIG. 15 is a schematic representation of a radiation gradient cure with a gradient photo-mask method of preparing functionally graded shape memory polymer products, according to an embodiment of the present invention.
Figure 16:
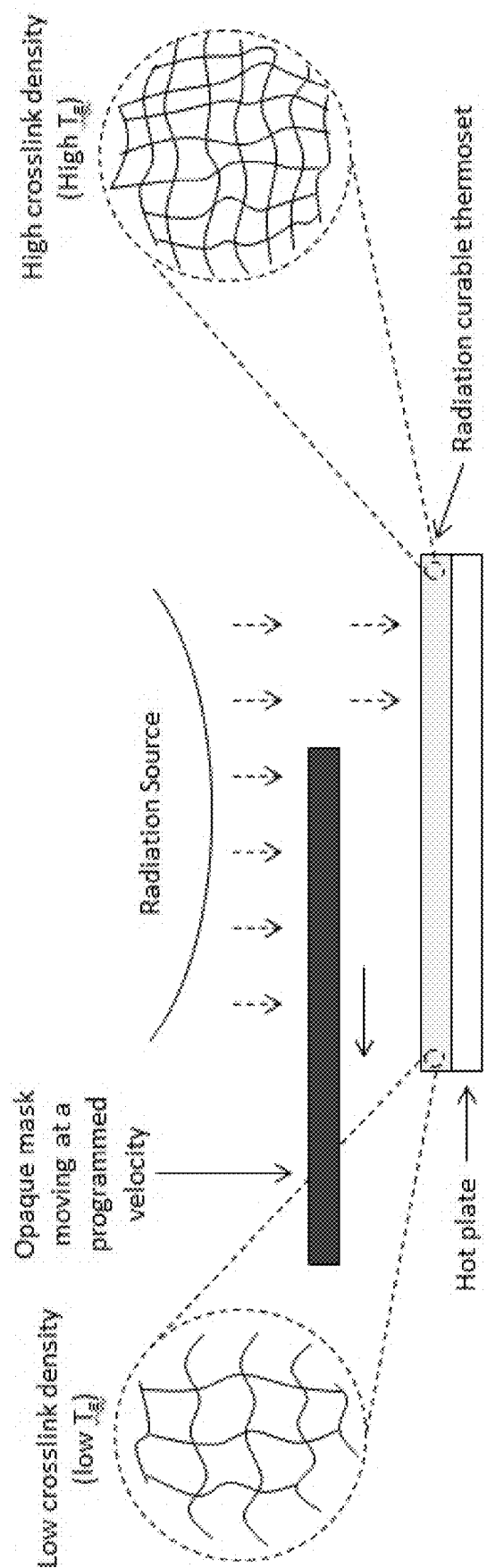
FIG. 16 is a schematic representation of a radiation gradient cure with a moving photo-mask method of preparing functionally graded shape memory polymer products, according to an embodiment of the present invention.

In accordance with an embodiment of the present invention, functionally graded shape memory polymer (FG-SMP) products can be prepared via one or more of the three general methods depicted in FIGS. 14-16.

In the first method shown in FIG. 14, a curable thermoset is cured on a temperature gradient from $T_{min}$ to $T_{max}$. The curable thermoset can be any material that polymerizes ("cures") into a macromolecular network under heat, radiation, curing agents, or a combination of one or more of them. Examples of curable thermosets include, but are not limited to, polyacrylates/polymethacrylates, thermosets formed by thiol-ene reactions, polyurethanes, epoxy resins, etc.

The temperature gradient can be applied by various methods, but is most conveniently achieved by using a temperature-gradient hot plate such as the one shown in FIGS. 1 A-B. The temperature gradient produces a gradient in crosslink density (as the schematic shows), thus a gradient of glass transition temperatures ($T_g$'s). Depending on the thermoset chemistry, a radiation source may or may not be required.

In the second method shown in FIG. 15, a radiation-curable thermoset is cured with a gradient photo-mask that attenuates the radiation differently along one or more directions, resulting in a gradient in crosslink density and a gradient in $T_g$. The radiation source is selected based on the thermoset chemistry. The most commonly used radiation to induce crosslinking of polymers is ultra-violet (UV) irradiation, which is defined as any electromagnetic radiation in the range between 10 nm and 400 nm.

A third method shown in FIG. 16, is to use an opaque photo-mask that moves to gradually expose the thermoset during cure, leading to a gradient in crosslink density and $T_g$ along the moving direction. The moving velocity is programmed to achieve the desired gradient profile.

Use and Functionality of Functionally Graded Shape Memory Polymers

The use and functionality of FG-SMPs are described herein below. Utilizing the responsiveness of FG-SMP to a broad range of temperatures (rather than only one for traditional shape memory polymers), FG-SMP can be used to produce temperature sensors. Several possible designs of temperature sensors from FG-SMPs are presented and discussed as non-limiting examples. In general, a deformation profile can be applied along the $T_g$ gradient direction of a FG-SMP. This deformation can be introduced by indentation, wrinkle formation (see discussion related to the Functionally Graded Shape Memory Polymer Wrinkle System section, below) or by macroscopic deformations such as stretching and bending.

Figure 17:
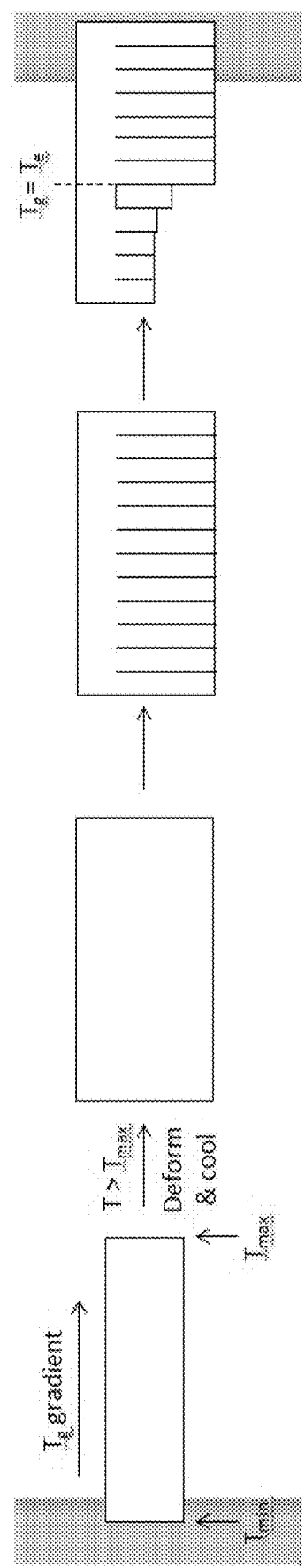
FIG. 17 is a schematic illustration showing the sensing of environmental temperature using FG-SMP, according to an embodiment of the present invention.

For example, as shown in FIG. 17, a FG-SMP can be heated to $T > T_{max}$, stretched perpendicular to the gradient direction and cooled to $T < T_{min}$ ($T_{min}$ is higher than room temperature). The FG-SMP would maintain, or "fix" into this deformed temporary shape. The material is then sliced along the gradient direction to give individual "fingers". The purpose of this is to mechanically isolate the "fingers" so they can recover relatively independently from each other. When the material is exposed to environmental temperature $T_e$ ($T_e$ being between $T_{min}$ and $T_{max}$), recovery will occur to the fingers with $T_g$'s below $T_e$ but not those with $T_g$'s higher than $T_e$. By inspecting the recovery profile of the fingers, the environmental temperature (or the highest environmental temperature the material has been exposed to) can be precisely determined. The design possibility is potentially endless.

Functionally Graded Shape Memory Polymer Wrinkle System

Figure 18:
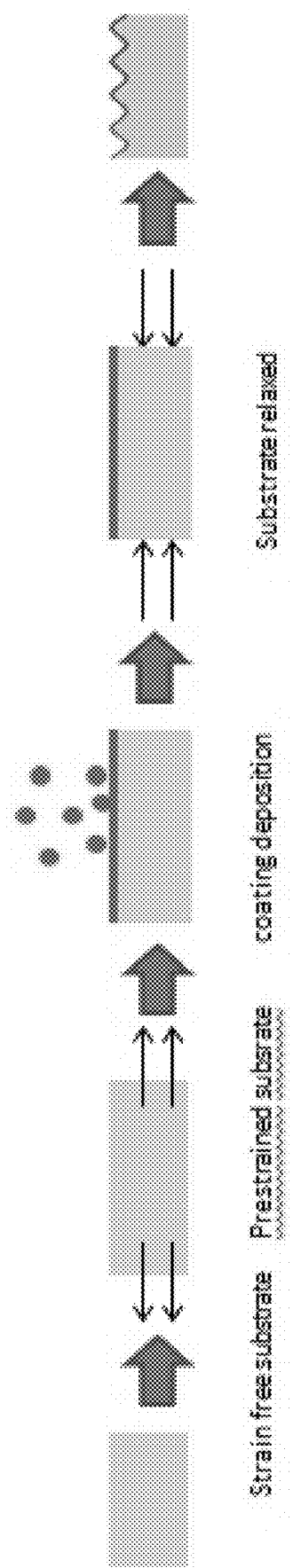
FIG. 18 is a schematic representation of a process for fabricating a wrinkled surface, according to an embodiment of the present invention.

Wrinkle occurs when a bilayer system consisting of a thick compliant substrate and a thin rigid film undergoes a compressive stress, causing the rigid film to buckle atop the compliant substrate shown in FIG. 18. In a bilayer system, the modulus mismatch of two layers is necessary for surface buckling to happen. The rigid skin layer can be introduced onto a prestrained compliant substrate by deposition, oxygen plasma and etc. Wrinkles will form upon compressive stress releasing.

Figure 19:
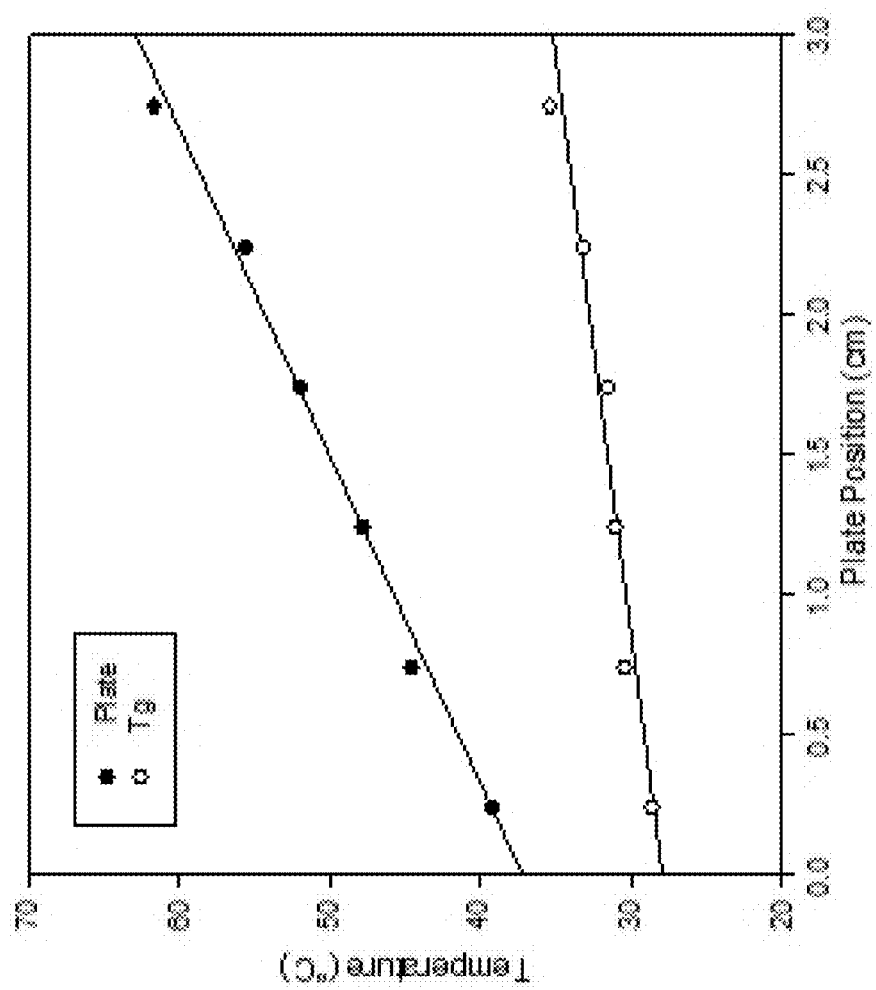
FIG. 19 is a graphical illustration of DSC characterization of functional gradient shape memory polymer, according to an embodiment of the present invention.

For example, in the FG-SMP wrinkle system in accordance with an embodiment of the present invention, a sample was 3 cm long with $T_g$ ranging from 28° C. to 36° C. in and gold served as a hard layer (see FIG. 19 for DSC characterization of functional gradient shape memory polymer). While gold is a convenient material to use as a coating for this purpose, any metallic coating that can be deposited onto the FG-SMP, for example by thermal evaporation, sputter coating, chemical vapor deposition, or electroless plating, will function in the desired manner. Further, polymeric coatings featuring modulus of elasticity at least 10× greater than that of the rubbery state of the FG-SMP (~1 MPa) will function in the desired manner. Such polymers include polystyrene, polycarbonate, poly(alkyl methacrylate)s, poly(alkyl acrylate)s, polyimides, and poly(arylene ether ketone)s. In brief, uniaxial stretching was conducted using the DMA to fix a strain into the FG-SMP. The sample was first heated to 80° C. and subsequently loaded until a prescribed strain was achieved. Upon reaching the prescribed strain the load was held constant and the sample was cooled to fix the strain into the substrate. For this experiment, uniaxial strain of 3% was applied. A gold coating was applied to the substrate via sputtering under room temperature. A total sputter time of 100 seconds used to a yield 33 nm thick layer. Gold-coated substrates were placed in an isothermal oven for 32 and 36° C. respectively for 30 minutes to allow the substrates recover and form wrinkles.

Figure 20C:
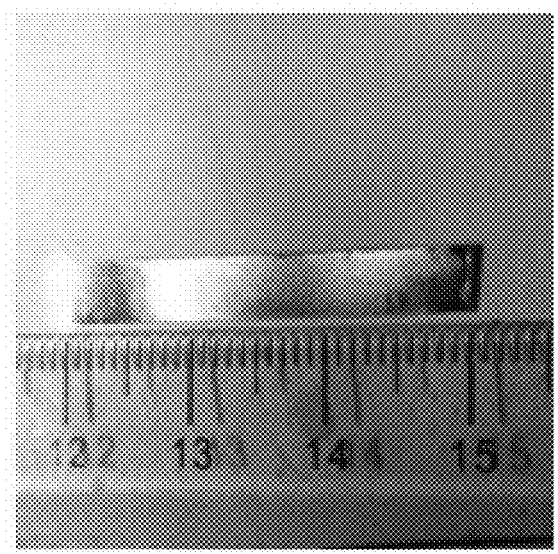
FIG. 20C is a photograph of a functionally graded shape memory polymer sample recovered at 36° C. according to an embodiment of the present invention.
Figure 20B:
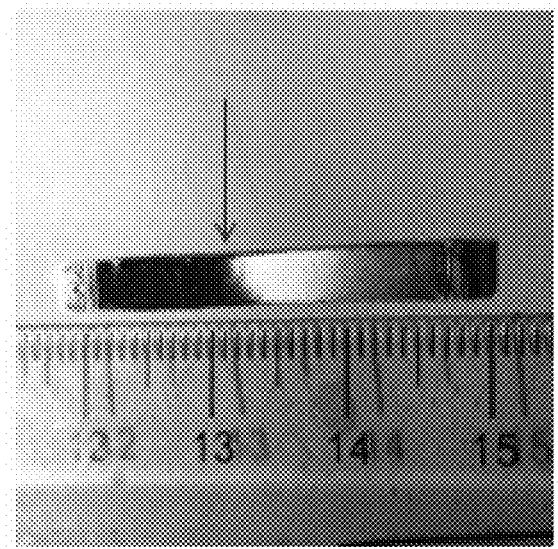
FIG. 20B is a photograph of a functionally graded shape memory polymer sample recovered at 32° C. according to an embodiment of the present invention.
Figure 20A:
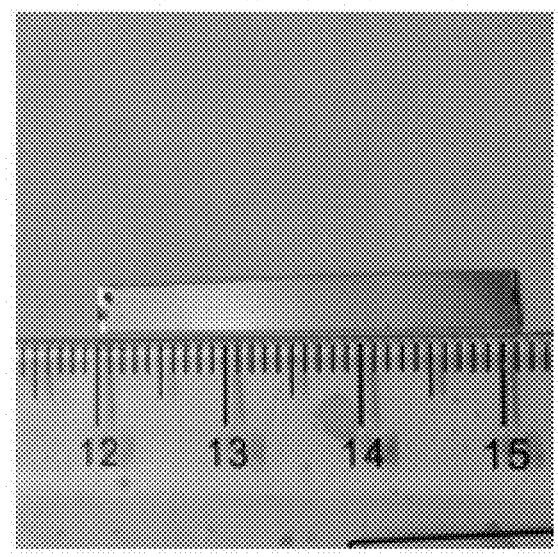
FIG. 20A is a photograph of a functionally graded shape memory polymer sample heated to 26° C. according to an embodiment of the present invention.
Figure 21:
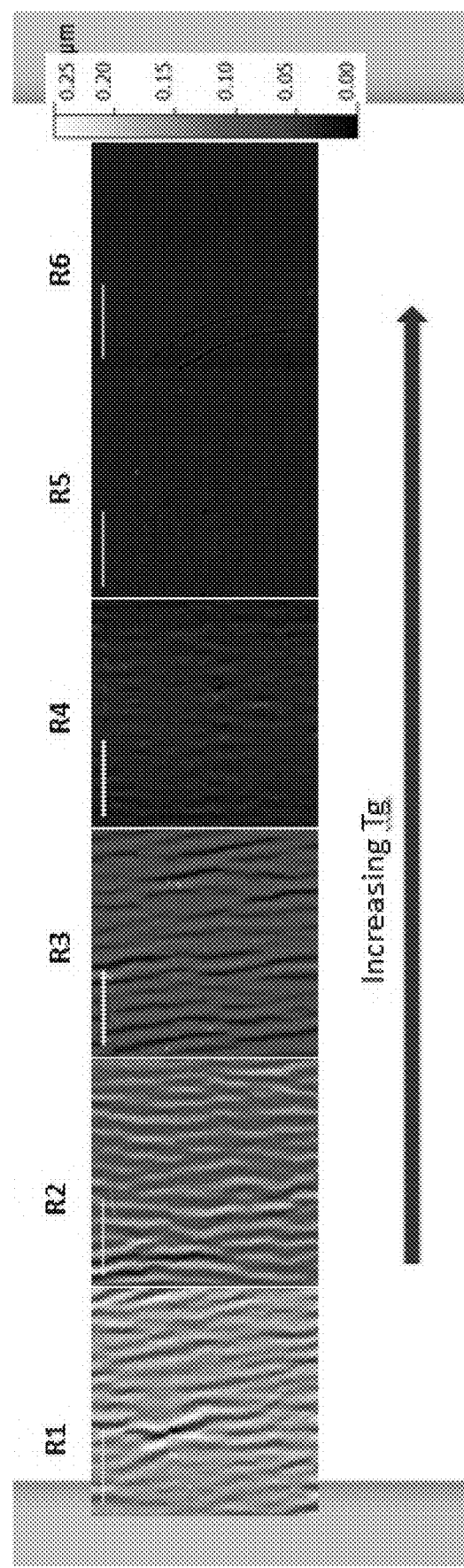
FIG. 21 are AFM height images of different regions on the sample shown and described with reference to FIGS. 20A-C, recovered at 32° C., according to an embodiment of the present invention.
Figure 22A:
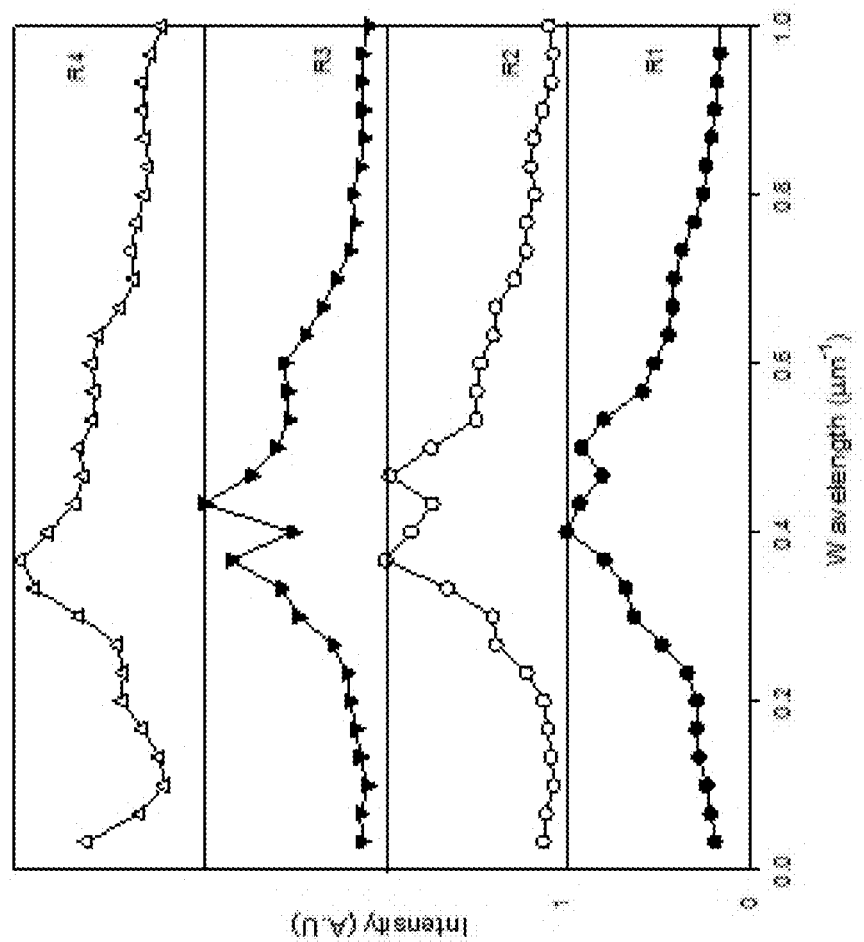
FIG. 22A is a graphical representation of 2D FFT analysis on a 32° C. recovered sample, as shown and described with respect to FIGS. 20-21 according to an embodiment of the present invention.
Figure 22B:
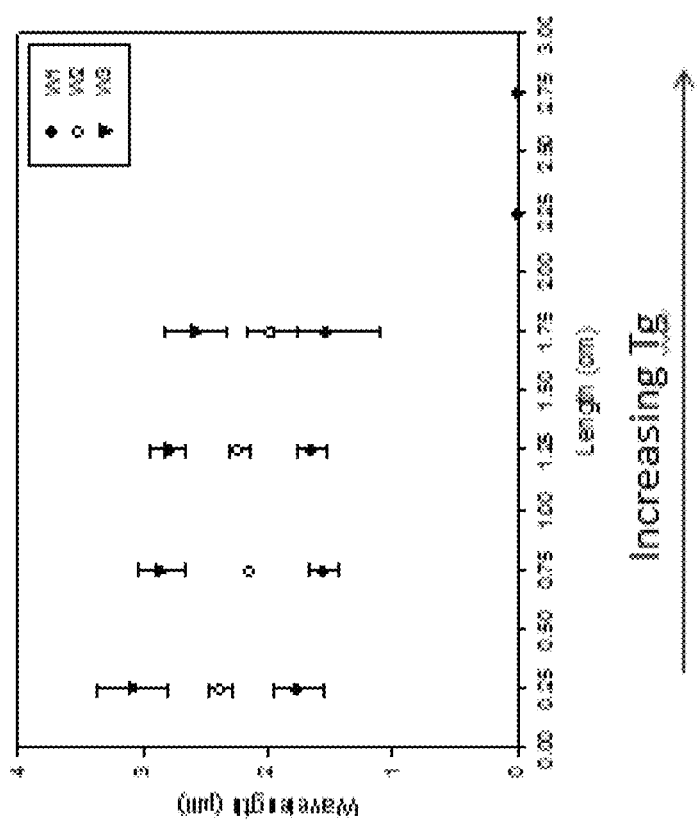
FIG. 22B is a graphical representation of 2D FFT analysis on 32° C. recovered sample, as shown and described with respect to FIGS. 20-21, W1, W2, W3 are three distinguished peaks from the graph in FIG. 22A according to an embodiment of the present invention.

The result in FIG. 20A shows that at 26° C. the sample did not show any change macroscopically. When the temperature increased to 32° C. (FIG. 20B), only part of the sample recovered and showed visible reflective color (forming wrinkles), and the rest area remained the same. At 36° C. (FIG. 20C), the whole sample recovered with flashy color. Close to nano-scale wrinkles were imaged and analyzed, and the results are shown in FIGS. 4 and 5. The wavelength decreased along the direction of increasing $T_g$. For this temperature sensing device, the surface color change (wrinkle formation) will move towards high $T_g$ end as increasing temperature. The temperature range will be adjustable for this application.

Preparation of Graded SMPs Using a Moving Mask Method

In accordance with an embodiment of the present invention, a method for preparing functionally graded SMPs using a moving photo-mask during UV curing is presented herein below. It is briefly described below for comparison with the temperature gradient curing approach.

Figure 23A:
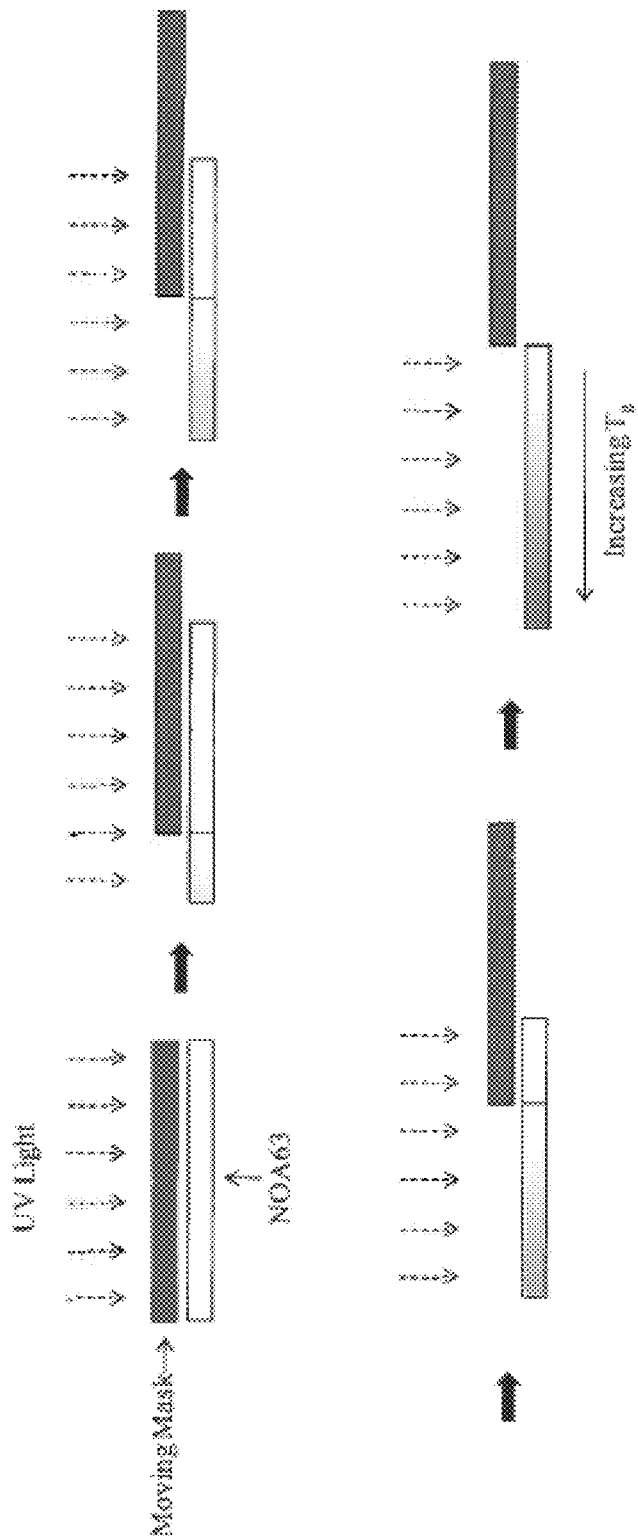
FIG. 23A is a schematic representation relating to the moving mask method for the preparation of functionally graded SMPs according to an embodiment of the present invention.

The method is shown schematically in FIG. 23A. In brief, uncured NOA63 was first uniformly coated on a glass slide that is 7.5 cm long. The photo-mask (attached to a custom built motion system) was set to move under the configuration shown in FIG. 23A at a constant velocity of 7.5 cm/h, which gradually exposed the NOA63 to UV light. The curing lasted for a total time of 61 min. Therefore, the sample had a gradient of exposure times along its length, with the shortest exposure time (the rightmost position as shown in the schematic) and longest exposure time (the leftmost position) being 1 min and 61 min, respectively. A gradient with increasing $T_g$'s from right to left was anticipated, since more exposure should lead to more crosslinking reactions thus a higher $T_g$.

Figure 23B:
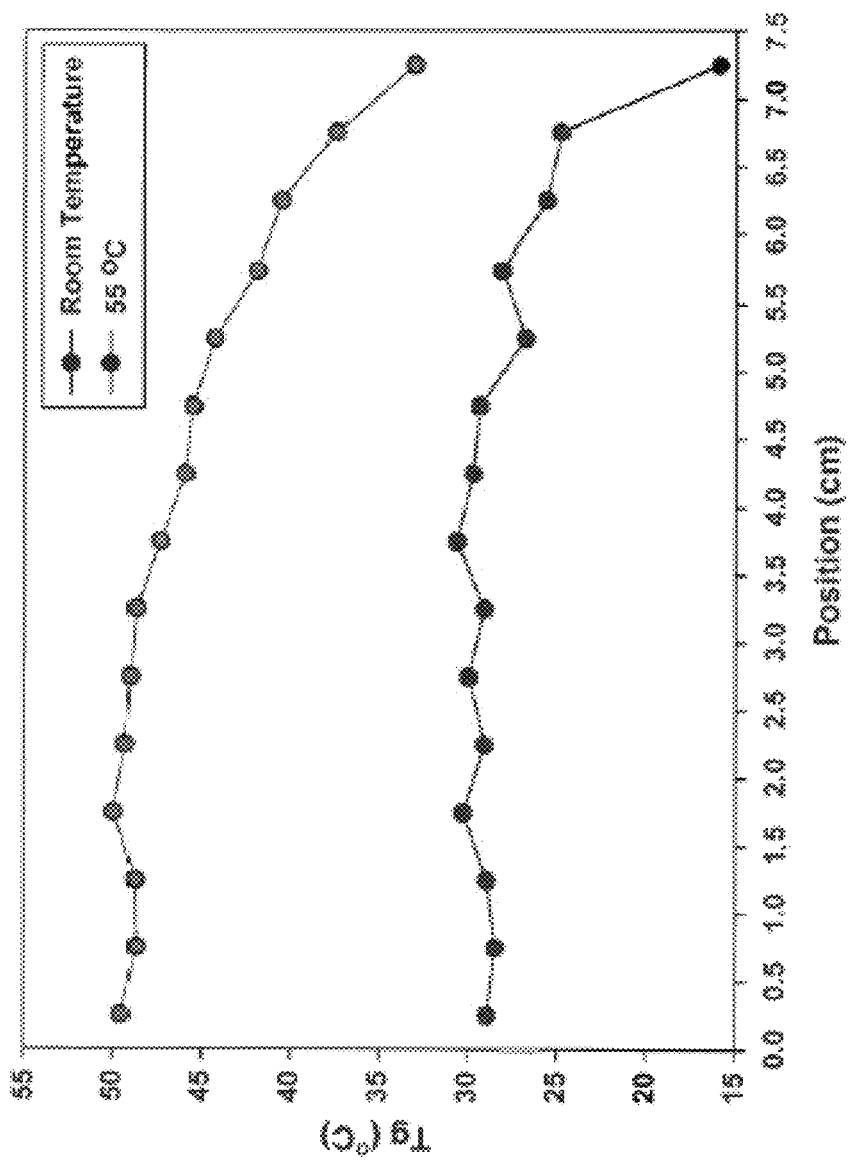
FIG. 23B shows a graphical illustration showing $T_g$ vs. position profiles for two graded NOA63 samples cured at different temperatures, according to an embodiment of the present invention.

FIG. 23B is a graphical illustration showing the $T_g$ vs. position profiles for two NOA63 samples cured at the room temperature (with no active heating or cooling) and 55° C., respectively. In the former case, the cured sample does not show a clear $T_g$ gradient. Except the last point (7.25 cm), all other locations display a very similar $T_g$ at c.a. 30° C. This reveals that a vitrification limit was imposed by the environmental temperature. In other words, the temperature during cure was approximately 30° C. (slightly higher than room temperature due to the heating effect from UV and also some reaction exotherm); the reaction quickly proceeded until the sample reached a $T_g$ that was equal to the environmental temperature (c.a. 30° C.). The material then vitrified, and the reaction was almost "terminated" due to limited diffusion. So, no matter how long the material is exposed to UV, the $T_g$ in this case would remain approximately at the environmental temperature (~30° C.).

A second curing with a moving mask was conducted at an elevated temperature of 55° C. using a hot-stage. In this case 55° C. is higher than the "ultimate" $T_g$ of NOA63 (the $T_g$ at full conversion; ~50° C.). This removes the vitrification limit in the first case discussed above. As a result, a $T_g$ gradient from 33 to 50° C. could be generated (FIG. 23B). However, compared to the result from temperature gradient curing (FIGS. 2A-B), the gradient here is not linear. This is simply due to the fact that in this system (or in any other thiol-ene systems) $T_g$ does not increase linearly with time. One would need to adjust the moving velocity of the photo-mask (rather than keeping it at a constant velocity) during the curing process in order to achieve a linear $T_g$ gradient.

Comparing these two methods, the temperature gradient curing is conceptually simpler and practically more feasible. It does not require much information on the reaction kinetics, and the $T_g$ gradient is controlled just by the applied temperature gradient. For the moving mask method, one would need to fully investigate the reaction kinetics (the relationships among $T_g$, time and temperature) to control the final $T_g$ gradient.

One comment has to be made concerning the amenability of these two methods to different types of polymerizations. In other words, can these two methods be applied to any polymerizing system? For the temperature gradient curing method, it is required that the polymerization exhibits a vitrification limit. This is usually the case for glass-forming, step-growth polymerizations, but is not commonly observed for chain-growth ("free-radical") polymerizations. This is due to the fundamental difference in polymerization mechanisms. Step-growth polymerizations proceed via a step-wise coupling mechanism, i.e., monomers forming dimers, dimers then forming tetramers, tetramers then forming octamers, etc. In other words, the molecular weight of the polymerizing system increases gradually and "uniformly". When vitrification occurs ($T_g = T_e$, $T_e$ being the environmental temperature), the diffusion of the reactive species is significantly limited due to their high molecular weight, rendering the reaction almost stagnant. In the case of chain-growth polymerizations, the system is composed of a certain number of growing chains within a vast amount of monomers. The reaction proceeds by the addition of monomers to the active, growing chains until they terminate. Under this situation, the reactive species are the monomers at any time during polymerization. The diffusion of monomers is quite easy due to their low molecular weight, regardless of whether the overall system vitrifies ($T_g = T_e$) or not. Therefore the effect of vitrification limit is minimal for chain-growth polymerizations. Considering the case of NOA63, it polymerizes via UV-initiated thiol-ene polymerization. It is well known to polymer scientists that thiol-ene network polymerization proceeds by a step-growth mechanism enabled by the creating of free radicals thermally or photochemically. Therefore, the temperature-gradient curing method worked well. However, it may not be applicable to chain-growth/free-radical polymerizations based on the mechanistic analysis above.

On the contrary, the moving mask method is not based on vitrification (as far as $T > T_u$, $T_u$ being the ultimate $T_g$ of the material) but the change of $T_g$ as a function of time. Therefore, it should be applicable to both polymerization types (step-growth and chain-growth), since in both cases the material $T_g$ would increase with time. However, the precise control of $T_g$ gradient would require a thorough understanding of the $T_g$—time relationship during polymerization (reaction kinetics). This broader applicability is an advantage of the moving mask method.

Finally, the exact condition under which the polymerization takes place is also important. This is mainly for practical reasons. Suppose the polymerization is thermally triggered and a $T_g$ gradient is prepared by the temperature gradient curing method. Once the graded material is exposed to $T > T_g$ (for example during shape fixing/recovery), the residue reaction will be triggered which would further raise the $T_g$. In other words, the $T_g$ gradient will change once the material is heated again. In the current case of NOA63, the polymerization is UV initiated; heat along cannot trigger the residue reaction (see the discussion in section 8.4). As a result, the material will maintain its $T_g$ gradient for repeated use under normal shape memory (heating/cooling) conditions. Therefore, from a design point of view the polymerization condition should be different from the application condition to render the $T_g$ gradient stable over time.

Accordingly, a functionally graded SMP encompassing a range of $T_g$'s distributed in a gradient fashion has been successfully fabricated by post-curing the material in a linear temperature gradient. Utilizing indentation-based surface shape memory, the gradient recovery properties of the material were explored and its ability to respond to a broad temperature range was demonstrated. Further, a macroscopic manifestation of the functionally graded shape memory phenomenon was demonstrated. Owing to its simplicity and optical characteristics, this new class of SMPs offers great potential for material-based temperature sensors as well as applications where controlled shape evolution during recovery is desired.

Shape Memory Polymers—Covalently Cross-Linked Glassy Thermoset Networks as SMPs

In accordance with an embodiment of the present invention, the following description of shape memory polymers is contemplated. See, e.g., C. Liu et al., Review of Progress in Shape Memory Polymers, J. Mater. Chem., 2007, 17, 1543-1558.

The simplest type of shape-memory polymer is a cross-linked glassy polymer featuring a sharp $T_g$ at the temperature of interest and rubbery elasticity above $T_g$ derived from covalent cross-links. This class of materials has attractive characteristics that include excellent degree of shape recovery afforded by rubbery elasticity due to the nature of permanent (or near permanent) cross-linking, tunable work capacity during recovery garnered by a rubbery modulus that can be adjusted through the extent of covalent cross-linking, and an absence of molecular slippage between chains due to strong chemical cross-linking. However, since the primary shape is covalently fixed, once processed (casting or molding) these materials are difficult to reshape thereafter. An example of this class is a chemically cross-linked vinylidene random copolymer consisting of two vinylidene monomers (one being methyl methacrylate and the other butyl methacrylate) whose homopolymers show two very different $T_g$ values of 110° C. and 20° C., respectively. The random copolymer itself gives a single, sharp $T_g$ that is tunable between the two $T_g$ values of the homopolymers by varying the composition. The work capacity, dictated by the rubbery modulus, is precisely adjustable to accommodate each particular application by varying the extent of cross-linking, in this case achieved by copolymerization with a tetra-ethylene glycol dimethacrylate. This thermoset shows complete shape fixing and fast, complete shape recovery in hot water at the stress-free stage. In addition, this polymer has the advantage of being castable and optically transparent.

Copolymerization and chemical cross-linking of renewable natural oils were worked on, having a high degree of unsaturation, with styrene and divinylbenzene to obtain random copolymer networks. These networks show tunable glass transitions and rubbery properties upon varying the monomer ratio. In this work, broad glass-transition spans were observed for all of the copolymers and this, in turn, apparently slowed the shape-recovery speed, though no shape-recovery speed data was shown. Complete shape fixing and shape recovery were observed at high temperatures. However, due to the broad glass-transition span and the coexistence of rigid, glassy fragments and soft, elastic rubbery segments, incomplete shape recovery occurs at these transition ranges. While attractive in their unique composition, an unfavorably broad $T_g$ might limit the materials as SMPs.

Besides the chemically cross-linked polymers, polymers with $T_g$>room temperature and with ultra-high molecular weight, >$10^6$ g mol$^{-1}$, may also be included in this category due to their lack of flow above $T_g$ and good shape fixing by vitrification. Such polymers feature a significant number of entanglements per chain (>25) and these entanglements function as physical cross-links on the time scale of typical deformations (1 s<t<10 s). Such physical cross-linking forms a three dimensional network that gives excellent elasticity above the glass transition, but makes thermal processing difficult; instead solvent-based processing may be required. These characteristics make the polymers essentially behave like the thermoset shape-memory polymers just discussed. An external force applied above the $T_g$ causes deformation to a secondary shape that can be fixed when cooled below $T_g$, which stores the elastic energy exerted during deformation. The decrease in mobility of PN molecules at T<$T_g$ maintains the secondary shape. The recovery of the original shape can be accomplished by reheating above its $T_g$, releasing the stored energy. Such polymers show quite complete shape fixing when vitrified and demonstrate fast and complete shape recovery due to the sharp glass-transition temperature and high entanglement density that forms a three dimensional network, evidenced by a flat rubbery plateau measured rheologically. However, the disadvantages of such materials are: 1) the transition temperature cannot be easily varied; 2) the modulus plateau, which controls the energy stored when deforming, is low (~1 MPa) and also hard to change; 3) the polymer will creep under stress at high temperature due to the finite lifetime of the entanglements; and 4) difficulty of processing because of the high viscosity associated with high molecular weight polymers. Thus, the processing of such materials is limited to solvent casting instead of more desirable thermal processing, such as extrusion, injection molding, or compression molding.

In addition to the examples given above, other materials are reported to be shape-memory materials based on the same mechanism, such as poly(alkyl methacrylate) copolymers, polystyrene copolymers, filler-modified epoxy networks, chemically cross-linked amorphous polyurethanes, poly((methyl methacrylate)-co-(N-vinyl-2-pyrrolidone))-PEG semi-IPNs, HDI-HPED-TEA network, and biodegradable copolyester-urethane networks. A list of shape-memory polymers based on glassy thermosets, along with references, is summarized in Table 2 below.

TABLE 2

Summary of shape-memory thermosets with the shape recovery triggered by their glass-transition temperatures

| Materials | Transition Temperature/ ° C. | Special features | Reference |
| --- | --- | --- | --- |
| P(MMA-co-VP)-PEG semi-IPNs | 65 | Semi-IPN | 66 |
| Copolyester | 48-66 | Biodegradable | 31 |
| P(AA-co-MMA)-PEG | 60 | Broad transition | 67 |
| Corn oil copolymer | 0-90 | Biomaterial | 39 |

TABLE 2-continued

Summary of shape-memory thermosets with the shape recovery triggered by their glass-transition temperatures

| Materials | Transition Temperature/ ° C. | Special features | Reference |
| --- | --- | --- | --- |
| PMMA-PBMA copolymers | 20-110 | Optically transparent | 59, 68, 69 |
| Epoxy | 50-80 | Filled reinforced | 40, 41, 65, 70 |
| Fish oil copolymers | 30-109 | Biodegradable | 36 |
| PET-PEG copolymer | Up to 80 | — | 71 |
| P(MA-co-MMA)-PEG | 50-90 | — | 72 |
| Soybean oil copolymers with styrene and DVB | 30-110 | Biomaterial | 37, 73 |
| Styrene copolymer | — | Optically transparent | 74 |
| Thermosetting PU | Up to 56 | Water swollen | 75 |
| Thermosetting PU | 0-150 | Ester type | 76 |
| Dehydrochlorinated cross-linked PVC | 80 | — | 77 |
| Polynorbornene | 40 | Sharp $T_g$ | 61, 62 |
| High $M_w$ PMMA | 105 | Deformable below $T_g$ | 2, 64 |

While several embodiments of the invention have been discussed, it will be appreciated by those skilled in the art that various modifications and variations of the present invention are possible. Such modifications do not depart from the spirit and scope of the present invention.

What is claimed is:

1. A method of preparing a functionally graded shape memory polymer, said method comprising the steps of:
   providing a shape memory polymer comprising a first end and a second end;
   applying an increasing temperature gradient to said shape memory polymer from said first end to said second end, wherein said application produces a corresponding increasing gradient in crosslink density and glass transition temperatures ($T_g$'s) to said shape memory polymer from said first end to said second end.

2. The method of claim 1, further comprising the step of photocuring said shape memory polymer by use of a radiation source.

3. The method of claim 1, wherein said shape memory polymer is a curable thermoset.

4. The method of claim 1, wherein said curable thermoset is selected from the group consisting of polyacrylates, polymethacrylates, thermosets formed by thiol-ene reactions, polyurethanes, and epoxy resins.

5. A method of preparing a functionally graded shape memory polymer, said method comprising the steps of:
   providing a shape memory polymer comprising a first end and a second end;
   photocuring said shape memory polymer by use of a radiation source through a gradient photomask, wherein said gradient photomask allows an increasing amount of radiation to reach said shape memory polymer from said first end to said second end, wherein said photocuring produces a corresponding increasing gradient in crosslink density and glass transition temperatures ($T_g$'s) to said shape memory polymer from said first end to said second end, wherein said photocuring is performed when said shape memory polymer is at a temperature greater than a maximum glass transition temperature ($T_g$) allowable by said shape memory polymer.

6. The method of claim 5, wherein said shape memory polymer is a radiation-curable theremoset.

7. The method of claim 5, wherein said radiation is ultra-violet radiation.

* * * * *